United States Patent
Egami et al.

(10) Patent No.: US 7,558,672 B2
(45) Date of Patent: Jul. 7, 2009

(54) DRIVING ASSISTANCE METHOD AND SYSTEM FOR CONVEYING RISK INFORMATION

(75) Inventors: Masahiro Egami, Yokosuka (JP); Shunsuke Hijikata, Kamakura (JP)

(73) Assignee: Nissan Motor Co., Ltd., Kanagawa (JP)

( * ) Notice: Subject to any disclaimer, the term of this patent is extended or adjusted under 35 U.S.C. 154(b) by 419 days.

(21) Appl. No.: 11/140,943

(22) Filed: Jun. 1, 2005

(65) Prior Publication Data

US 2005/0273263 A1    Dec. 8, 2005

(30) Foreign Application Priority Data

Jun. 2, 2004   (JP) ............................ P2004-164755

(51) Int. Cl.
*G08G 1/16* (2006.01)
(52) U.S. Cl. .................. 701/301; 340/436; 340/903
(58) Field of Classification Search ......... 701/300–302, 701/41; 340/425.5, 435, 436, 438; 342/29, 342/41, 70; 180/167–169
See application file for complete search history.

(56) References Cited

U.S. PATENT DOCUMENTS 5,765,116 A * 6/1998 Wilson-Jones et al. ........ 701/41
6,959,970 B2 * 11/2005 Tseng ........................ 303/146
7,222,009 B2 * 5/2007 Hijikata et al. ................ 701/41
2003/0229447 A1 * 12/2003 Wheatley et al. ............ 701/300

FOREIGN PATENT DOCUMENTS

| JP | 01-161600 | 6/1989 |
|----|-----------|--------|
| JP | 04-123200 | 4/1992 |
| JP | 06-249956 | 9/1994 |
| JP | 08-058503 | 3/1996 |
| JP | 2001-199260 | 7/2001 |
| JP | 2001-199296 | 7/2001 |
| JP | 2002-074596 | 3/2002 |

OTHER PUBLICATIONS

Japanese Office Action dated Sep. 9, 2008.

* cited by examiner

*Primary Examiner*—Yonel Beaulieu
(74) *Attorney, Agent, or Firm*—McDermott Will & Emery LLP

(57) ABSTRACT

A driving assisting system for conveying risk information to a driver of a vehicle. The system includes a detector configured to acquire data related to a driving condition of the vehicle and an object in the vicinity of the vehicle, and a data processor configured to calculate a collision risk potential of the vehicle to collide with the object based on the data related to the driving condition of the vehicle and the object. Information related to the collision risk potential to the driver of the vehicle via a visual signal and a haptic signal.

29 Claims, 19 Drawing Sheets

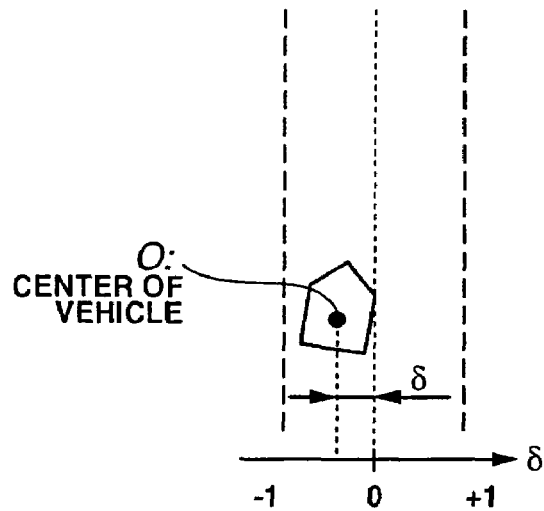
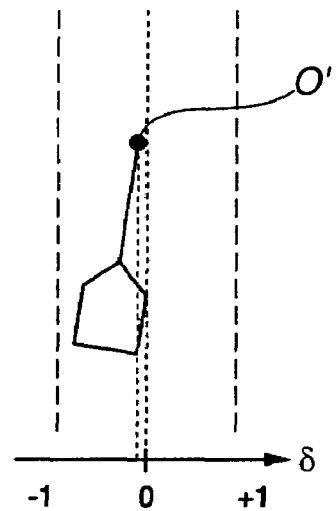
FIG.6(a) FIG.6(b)
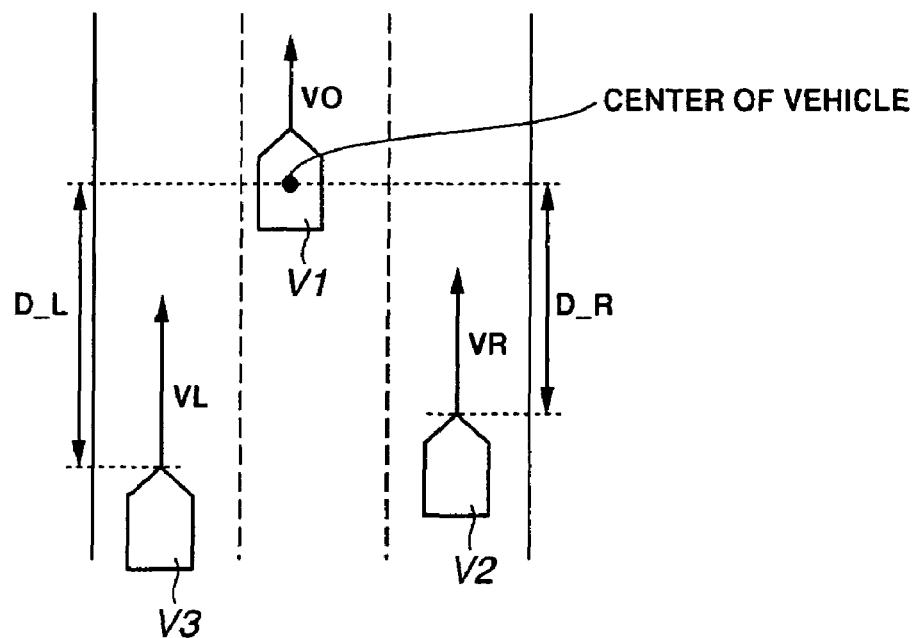
FIG.7

FIG.8

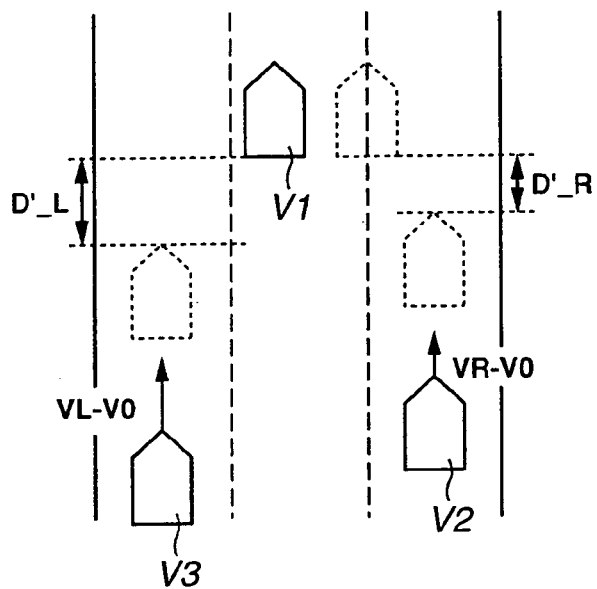

FIG.9

|  | LOW RP REGION | HIGH RP REGION |
|---|---|---|
| PRESSURE INPUT TO DRIVER VIA SEAT | IN-LANE RUNNING STATE OF HOST VEHICLE | RP: AMOUNT, DIRECTION |
| DISPLAY | DEGREE OF APPROACH TO HOST VEHICLE FROM EACH OF FOLLOWING VEHICLES WITHIN THE ADJACENT NEXT LANES | ON ONE (RP) SIDE: PR (AMOUNT, DIRECTION) ON THE OTHER SIDE: DEGREE OF APPROACH TO HOST VEHICLE FROM FOLLOWING VEHICLE WITHIN THE ADJACENT NEXT LANE ON THE OTHER SIDE |

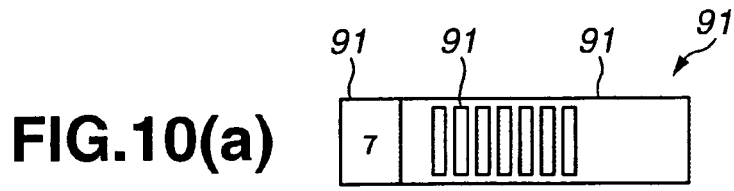
FIG.10(a)
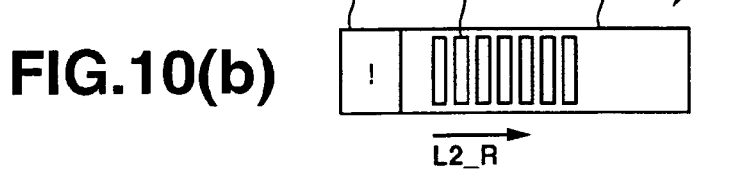
FIG.10(b)
FIG.11(a)
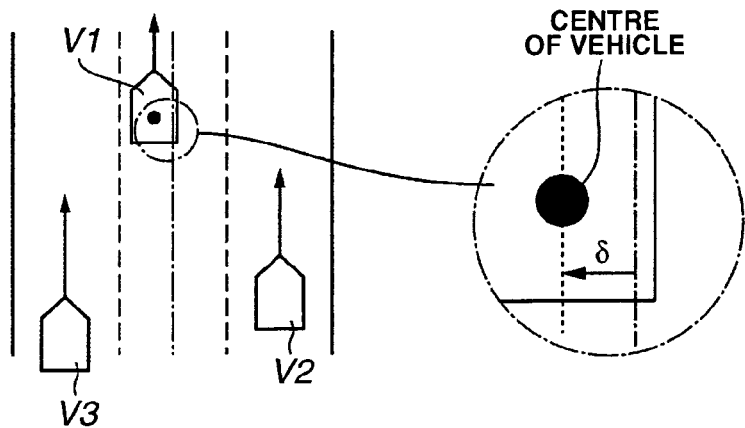
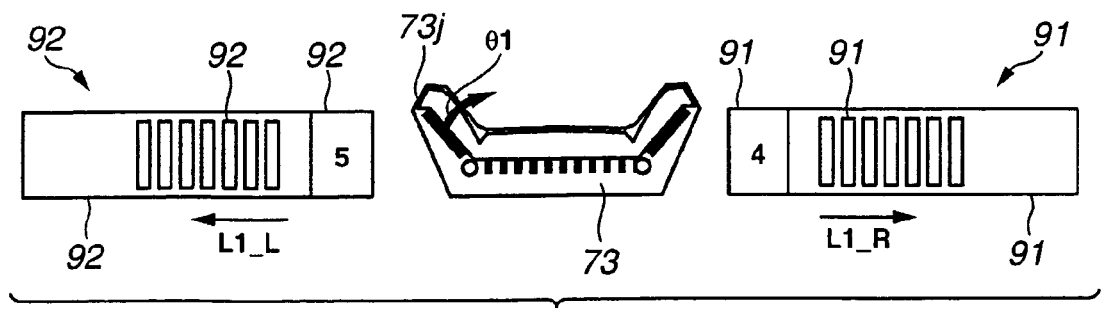
FIG.11(b)

FIG.14

|  | LOW RP REGION | HIGH RP REGION |
|---|---|---|
| PRESSURE INPUT TO DRIVER VIA SEAT | IN-LANE RUNNING STATE OF HOST VEHICLE | RP: AMOUNT, DIRECTION |
| DISPLAY | DEGREE OF APPROACH TO HOST VEHICLE FROM EACH OF FOLLOWING VEHICLES WITHIN THE ADJACENT NEXT LANES | ON ONE (RP) SIDE: RP (AMOUNT, DIRECTION)<br><br>ON THE OTHER SIDE: DEGREE OF APPROACH TO HOST VEHICLE FROM FOLLOWING VEHICLE WITHIN THE ADJACENT NEXT LANE ON THE OTHER SIDE (LESS STIMULATIVE) |

FIG.15(a)
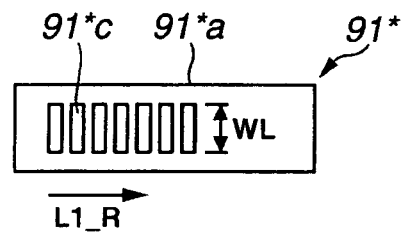

FIG.15(b)
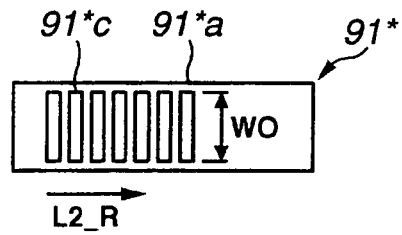

FIG.17

|  | LOW RP REGION | HIGH RP REGION |
|---|---|---|
| PRESSURE INPUT TO DRIVER VIA SEAT | IN-LANE RUNNING STATE OF HOST VEHICLE | RP: AMOUNT, DIRECTION<br>IN-LANE RUNNING STATE OF HOST VEHICLE |
| DISPLAY | DEGREE OF APPROACH TO HOST VEHICLE FROM EACH OF FOLLOWING VEHICLES WITHIN THE ADJACENT NEXT LANES | ON ONE (RP) SIDE:<br>RP (AMOUNT, DIRECTION)<br><br>ON THE OTHER SIDE:<br>DEGREE OF APPROACH TO HOST VEHICLE FROM FOLLOWING VEHICLE WITHIN THE ADJACENT NEXT LANE ON THE OTHER SIDE |

FIG.18

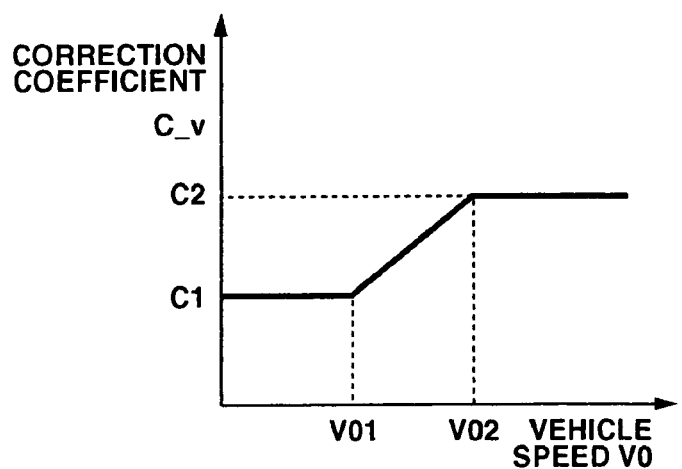

FIG.21

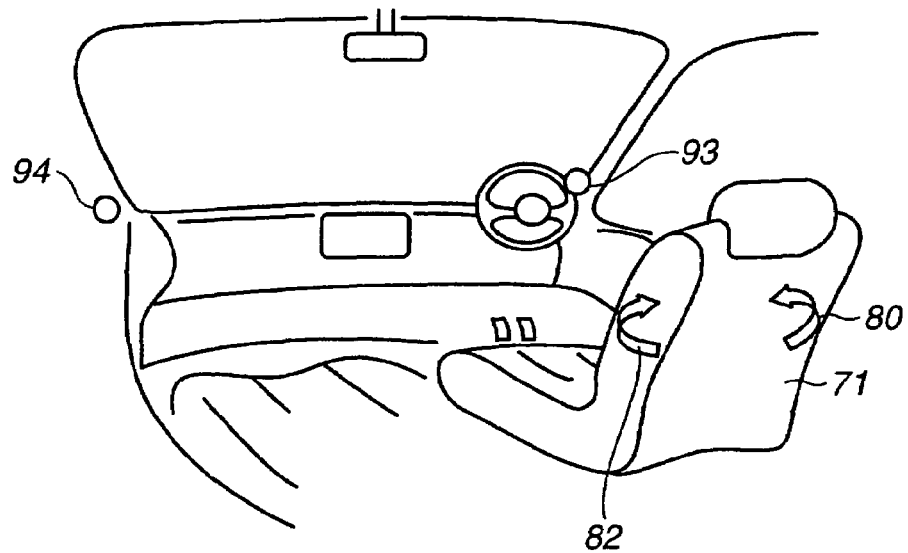

FIG.22

|  | LOW RP REGION | HIGH RP REGION |
|---|---|---|
| PRESSURE INPUT TO DRIVER VIA SEAT | IN-LANE RUNNING STATE OF HOST VEHICLE | RP: AMOUNT, DIRECTION |
| INDICATOR LAMP | DEGREE OF APPROACH TO HOST VEHICLE FROM EACH OF FOLLOWING VEHICLES WITHIN THE ADJACENT NEXT LANES | ON ONE (RP) SIDE: RP (AMOUNT, DIRECTION)<br><br>ON THE OTHER SIDE: DEGREE OF APPROACH TO HOST VEHICLE FROM FOLLOWING VEHICLE WITHIN THE ADJACENT NEXT LANE ON THE OTHER SIDE |

FIG.23

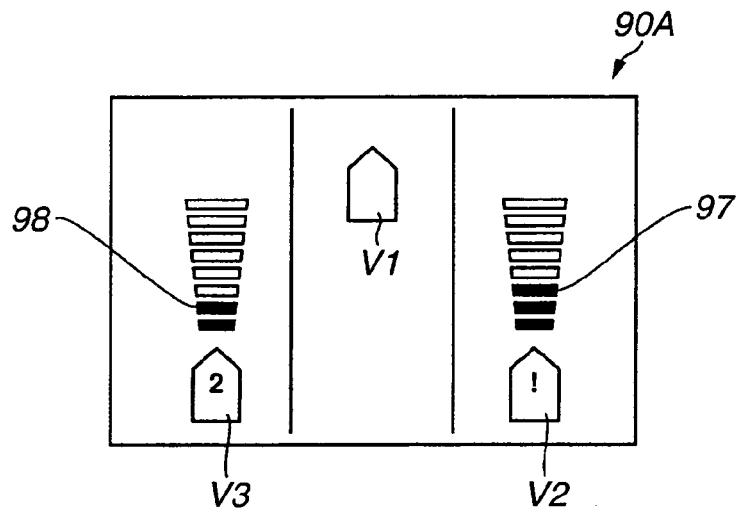

FIG.24

|  | LOW RP REGION | HIGH RP REGION |
|---|---|---|
| PRESSURE INPUT TO DRIVER VIA SEAT | IN-LANE RUNNING STATE OF HOST VEHICLE | RP: AMOUNT, DIRECTION |
| DISPLAY WITHIN METER | DEGREE OF APPROACH TO HOST VEHICLE FROM EACH OF FOLLOWING VEHICLES WITHIN THE ADJACENT NEXT LANES | ON ONE (RP) SIDE: RP (AMOUNT, DIRECTION)<br><br>ON THE OTHER SIDE: DEGREE OF APPROACH TO HOST VEHICLE FROM FOLLOWING VEHICLE WITHIN THE ADJACENT NEXT LANE ON THE OTHER SIDE |

FIG.27

|  | LOW RP REGION | HIGH RP REGION |
|---|---|---|
| INDICATOR LAMP | IN-LANE RUNNING STATE OF HOST VEHICLE | RP: DIRECTION |
| DISPLAY ON THE RIGHT AND LEFT | DEGREE OF APPROACH TO HOST VEHICLE FROM EACH OF FOLLOWING VEHICLES WITHIN THE ADJACENT NEXT LANES | ON ONE (RP) SIDE: RP (AMOUNT, DIRECTION)<br><br>ON THE OTHER SIDE: DEGREE OF APPROACH TO HOST VEHICLE FROM FOLLOWING VEHICLE WITHIN THE ADJACENT NEXT LANE ON THE OTHER SIDE |

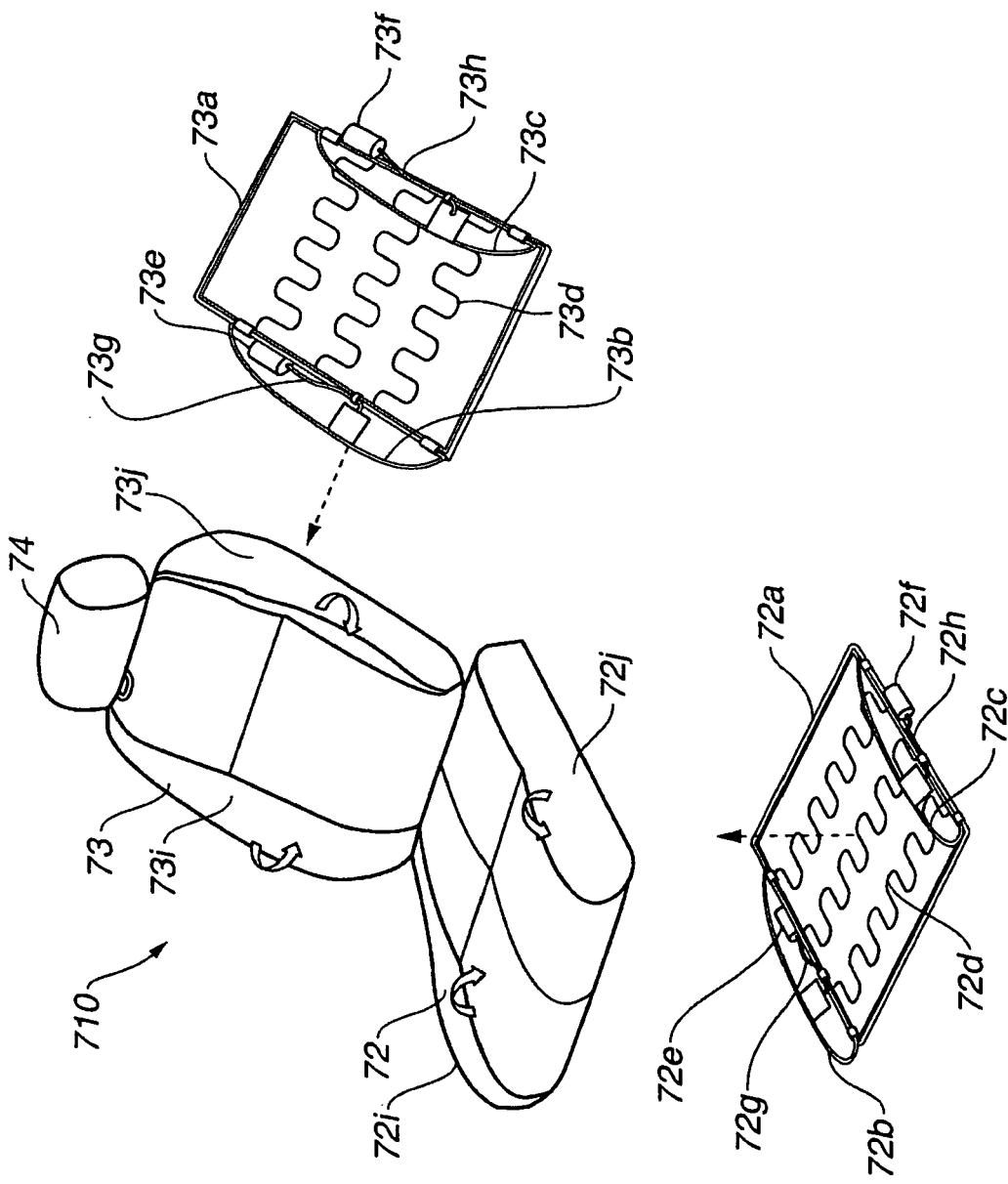

DRIVING ASSISTANCE METHOD AND SYSTEM FOR CONVEYING RISK INFORMATION

RELATED APPLICATION

The present application claims the benefit of priority from Japanese Patent Application No. 2004-164755, filed Jun. 2, 2004, the disclosure of which is incorporated herein by reference in its entirety.

FIELD OF THE DISCLOSURE

The present disclosure relates to driving assistance methods and systems, and more particularly, to methods and systems configured to provide a driver with various types of information related to the vehicle operated by the driver and any vehicles in selected vicinity.

BACKGROUND OF THE DISCLOSURE

JP 06-249956 A describes a driver assisting system including an accelerator pedal, which is provided with an activator. Upon an abnormal approach to an obstacle, the activator creates vibrations on the accelerator pedal. Since the accelerator pedal is vibrated in addition to the conventional audio or optical display, the driver can recognize the abnormal approach to the obstacle. In this conventional driver assisting system, the abnormal approach to an obstacle is transmitted to a driver by a plurality of means. However, the different means used in the conventional driver assisting system all transmit the same information. The conventional systems cannot transmit different types of risk information to the driver.

Accordingly, there is a need for a system that can transmit different types of risk information to a driver.

SUMMARY OF THE DISCLOSURE

Various embodiments of driving assisting systems and methods are described. An exemplary driving assisting system for use in a vehicle includes a detector configured to acquire data related to a driving condition of the vehicle and an object in the vicinity of the vehicle and a data processor configured to calculate a collision risk potential of the vehicle to collide with the object based on the data related to the driving condition of the vehicle and the object. Information related to the collision risk potential is provided to the driver of the vehicle via a visual signal and a haptic signal. The object may be a vehicle. In one aspect, the provided information is selected from multiple types of information including at least two of a position of the vehicle within the lane in which the vehicle is driving, a relative position between the vehicle and the object, a relative movement between the vehicle and the object, a direction from which the object is approaching the vehicle, and the calculated collision risk potential. In another aspect, the provided information relates to at least one of an indication of a position of the object relative to the vehicle, a relative speed between the object and the vehicle, a distance between the vehicle and the object, and a magnitude of the risk potential.

According to one embodiment, responsive to the collision risk potential being a low risk, the data processor is configured to provide information related to a position of the vehicle within the lane in which the vehicle is driving via a haptic signal from the driver's seat. And responsive to the collision risk potential qualifying as a high risk, the data processor is configured to provide at least on of an indication of a position of the object relative to the vehicle, a relative speed between the object and the vehicle, a distance between the vehicle and the object, and a magnitude of the risk potential via at least one of a haptic signal and a visual display.

According to another embodiment, the haptic signal is conveyed via the driver's seat of the vehicle. The visual signal may be displayed via a first display device corresponding to the left side of the vehicle, and a second display device corresponding to the right side of the vehicle, and the visual signal may be conveyed via one of the first display device and the second display device that corresponds to the position of the object relative to the vehicle. In one aspect, the first display device is disposed on or near the left side mirror of the vehicle, and the second display device is disposed on or near the right side mirror of the vehicle. In another aspect, the haptic signal includes at least one of a first haptic input provided from a first portion of the driver's seat corresponding to the left side of the vehicle, and a second haptic input provided from a second portion of the driver's seat corresponding to the right side of the vehicle, and the haptic signal is conveyed via one of the first portion of the driver's seat and the second portion of the driver's seat that corresponds to the position of the object relative to the vehicle. In still another aspect, the haptic signal is regulated to reflect the magnitude of the risk potential.

An exemplary driving assisting method for use in a vehicle acquires data related to a driving condition of the vehicle and an object in the vicinity of the vehicle. A collision risk potential of the vehicle to collide with the object is calculated based on the data related to the driving condition of the vehicle and the object. Information related to the collision risk potential is provided to the driver of the vehicle via a haptic signal and a visual signal.

According to another embodiment, an exemplary driving assisting method for use in a vehicle acquires data related to a driving condition of the vehicle and an object in the vicinity of the vehicle. A collision risk potential of the vehicle to collide with the object is calculated based on the data related to the driving condition of the vehicle and the object. A spatial relationship of the object relative to the vehicle is determined. Information related to the collision risk potential and the spatial relationship of the object relative to the vehicle is provided via at least one of a visual display and a haptic signal.

According still another embodiment of this disclosure, an exemplary driving assisting system for use in a vehicle comprises a detector configured to acquire data related to a driving condition of the vehicle and an object in the vicinity of the vehicle, and a data processor configured to calculate a collision risk potential of the vehicle to collide with the object based on the data related to the driving condition of the vehicle and the object and a spatial relationship of the object relative to the vehicle. Information related to the collision risk potential and the spatial relationship of the object relative to the vehicle is provided via at least one of a visual display and a haptic signal.

According to a further embodiment of this disclosure, a vehicle is implemented with the above-described driving assisting methods and systems.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout.

FIGS. 6(a) and 6(b) are views illustrating two different manners of calculating an in-lane lateral distance of the vehicle.

FIG. 7 is a view illustrating a traffic scene in which a host vehicle is followed by two vehicles traveling within the adjacent lane on the right and the adjacent lane on the left.

FIG. 8 is a traffic scene used to illustrate a "risk potential (RP)".

FIG. 9 is a table tabulating pieces of information, which the first exemplary embodiment presents to the driver via a plurality of interfaces versus low and high RP regions.

FIGS. 10(a) and 10(b) show different states of a display portion on the right.

FIG. 11(a) is a traffic scene when the RP falls in the low RP region.

FIG. 11(b) shows the transmission of different pieces of information to the driver when the RP falls in the low RP region.

FIG. 14 is a table tabulating pieces of information, which a second exemplary embodiment presents via a plurality of interfaces.

FIG. 15(a) and 15(b) show different states of a display portion on the right.

FIG. 17 is a table tabulating pieces of information, which a third exemplary embodiment presents via a plurality of interfaces.

FIG. 18 shows varying of a correction coefficient C_v, which a fourth exemplary embodiment uses, with different values of vehicle speed V0 of a host vehicle.

FIG. 21 is a similar view to FIG. 4 illustrating a display composed of indicator lamps employed by a sixth exemplary embodiment.

FIG. 22 is a table tabulating pieces of information, which the sixth exemplary embodiment presents via a plurality of interfaces.

FIG. 23 is a diagram of a display within a meter cluster, which is employed by a seventh exemplary embodiment.

FIG. 24 is a table tabulating pieces of information, which the seventh exemplary embodiment presents via a plurality of interfaces.

FIG. 27 is a table tabulating pieces of information, which the ninth exemplary embodiment presents via a plurality of interfaces.

FIG. 28 is a similar view to FIG. 3(a) illustrating a driver seat employed by a tenth exemplary embodiment.

DETAILED DESCRIPTION OF ILLUSTRATIVE EMBODIMENTS

In the following description, for the purposes of explanation, numerous specific details are set forth in order to provide a thorough understanding of the present disclosure. It will be apparent, however, to one skilled in the art that concepts of the disclosure may be practiced or implemented without these specific details. In other instances, well-known structures and devices are shown in block diagram form in order to avoid unnecessarily obscuring the present disclosure.

First Exemplary Embodiment

Figure 1:
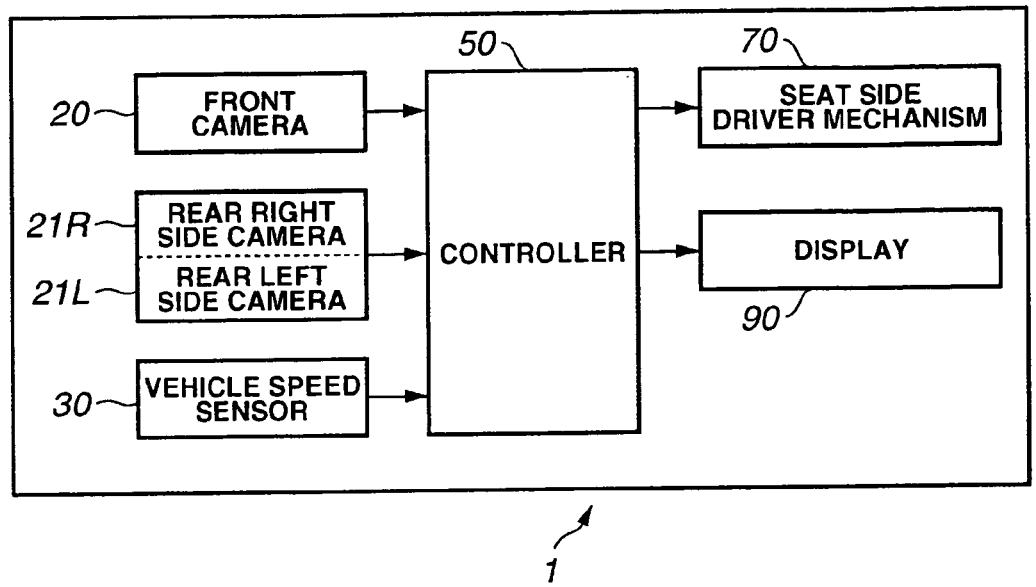
FIG. 1 is a block diagram illustrating a first exemplary embodiment of a driver assisting system according to the present disclosure.
Figure 2:
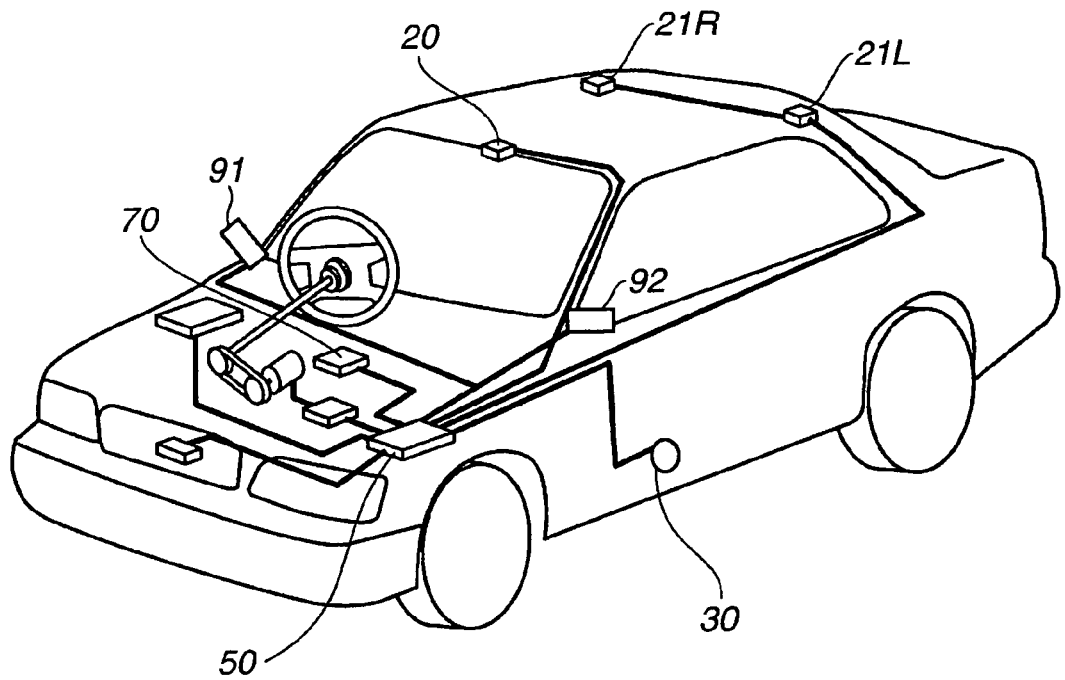
FIG. 2 is a perspective view of a vehicle in the form of an automotive vehicle installed with the driver assisting system.

FIGS. 1 and 2 illustrate the first exemplary embodiment of a driver assisting system. FIG. 1 shows a block diagram of an exemplary driver assisting system 1. FIG. 2 depicts an automotive vehicle equipped with driver assisting system 1.

Driver assisting system 1 includes a front view camera or a front camera 20, a rear right side view camera or a rear right side camera 21R, a rear left side view camera or a rear left side camera 21L, a vehicle speed sensor 30, a controller 50, a seat side driver mechanism 70, and a display 90.

The front camera 20 is an image capturing device, such as cameras with CCD-type or CMOS-type sensors. The front camera 20 may be mounted to the vehicle in the vicinity of an internal rear view mirror to pick up images of the road ahead of the vehicle. The region covered by the front camera 20 extends 30 degrees from the camera axis to each side of the camera. Images picked up by the front camera 20 are received by the controller 50.

The rear right and left side cameras 21R and 21L are image capturing devices, such as cameras with CCD-type or CMOS-type image sensors, and are configured to detect road conditions on the sides and rear of the vehicle. The rear right side camera 21R is mounted to the vehicle in the vicinity of an upper right corner portion of a rear window to pick up images of an adjacent lane on the right and rear side of the vehicle, and the rear left side camera 21L is mounted to the vehicle in the vicinity of an upper left corner portion of the rear window to pick up images of an adjacent lane on the left and rear side of the vehicle. The front camera 20, and rear right and left side cameras 21R and 21L provide the detected road conditions around the vehicle to the controller 50.

Vehicle speed sensor 30 detects a vehicle speed of the vehicle by measuring a revolution speed of a wheel or an output element of a transmission, and provides the detected vehicle speed to controller 50.

Controller 50 may be composed of a central processing unit (CPU), a read only memory (ROM), a random access memory (RAM), and CPU peripheral devices. Controller 50 detects state of obstacle(s) around a host vehicle by evaluating the vehicle speed received from vehicle speed sensor 30 and images picked up by front, rear right side and rear left side cameras 20, 21R and 21L. In one embodiment, controller 50 detects the state of obstacle(s) by recognizing a displacement of the host vehicle within a lane from lane boundaries (lane markers), presence or absence of another vehicle(s) in adjacent lane(s), and/or relative position(s) of the host vehicle and other vehicle(s) in adjacent lane(s) to the host vehicle.

Based on the detected state of obstacle(s), controller 50 calculates a "risk potential (RP)" indicative of a risk of collision between the host vehicle and each of the vehicle(s) around the host vehicle. Controller 50 transmits the state of obstacle(s) and the potential risk to a driver of the host vehicle via haptic information or input from a driver's seat and visual information or input from a display by controlling a seat side driver mechanism 70 and a display 90. In one embodiment, controller 50 is configured to change the manner by which the states of obstacle(s) and potential risk are transmitted to the driver.

Figure 3A:
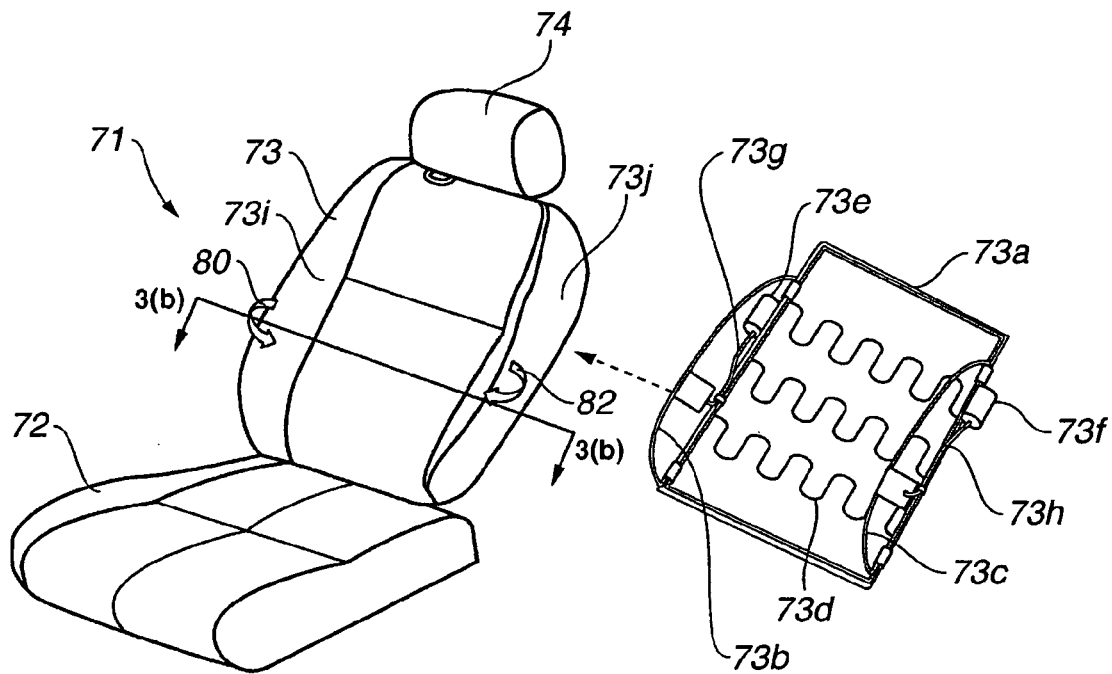
FIG. 3(a) is an exploded view of a driver seat mounted within the vehicle installed with the driver assisting system.
Figure 3B:
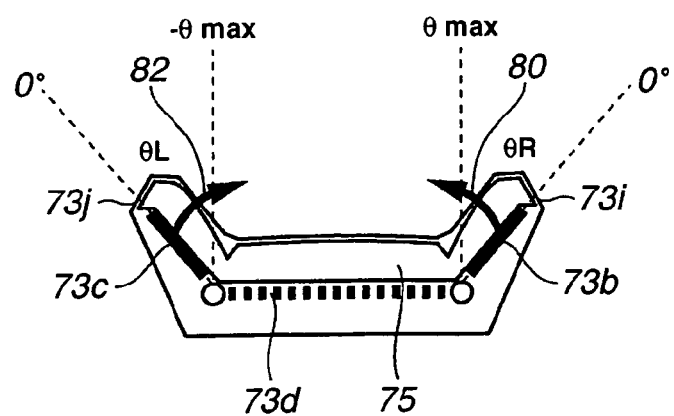
FIG. 3(b) is a cross sectional view taken through the line 3(b)-3(b) in FIG. 3(a).

In response to a command from controller 50, seat side driver mechanism 70 modifies a contour of the seat to transmit the state of obstacle(s) or risk potential via a pressure input from the seat. Referring to FIG. 3(*a*), a driver's seat 71 with seat side driver mechanism 70 is described below.

As shown in FIGS. 3(*a*) and 3(*b*), seat 71 includes a cushion 72, a back rest 73 and a head rest 74. Cushion 72 and back rest 73 include pads 75. According to the first exemplary embodiment, the seat side driver mechanism 70 swings or moves the right side portion 73*i* and let side portion 73*j* of the back rest 73 to produce haptic pressure inputs to the driver.

The back rest 73 includes a seat back frame 73*a*, a right side frame 73*b* and a left side frame 73*c*. Pads 75 cover these frames 73*a*, 73*b*, and 73*c*. Seat back frame 73*a* has springs 73*d* to support pad 75.

Right and left side portions 73*i* and 73*j* include right and left side frames 73*b* and 73*c*, respectively. Right side frame 73*b* is movingly connected to seat back frame 73*a* for producing angular rotational movements as indicated by arrow 80. Left side frame 73*c* is movingly connected to the seat back frame for producing angular rotational movements as indicated by arrow 82.

In order to control angular positions of the right and left side frames 73*b* and 73*c*, seat side driver mechanism 70 includes motor units 73*e* and 73*f*. As shown in FIG. 3(*a*), motor units 73*e* and 73*f* are attached to seat back frame 73*a* near the right and left sides, respectively. Output torque of motor unit 73*e* is transmitted by a torque cable 73*g* to right side frame 73*b*, thereby to rotate the right side frame 73*b*. Output torque of motor unit 73*f* is transmitted by a torque cable 73*h* to left side frame 73*c*, thereby to rotate left side frame 73*c*.

FIG. 3(*b*) illustrates the rest or 0° positions of right and left side frames 73*b* and 73*c*. The right and left side frames are settable to any angular positions between 0° and the maximum degree ±θmax. Right side frame 73*b* can rotate counterclockwise, as seen in FIG. 3(*b*), to a generally upright limit position θmax with respect to an imaginary plane of seat back frame 73*a*. Left side frame 73*c* can rotate clockwise, as shown in FIG. 3(*b*), to a generally upright limit position −θmax relative to the imaginary plane of seat back frame 73*a*.

Seat side driver mechanism 70 operates in response to commands issued by the controller 50, and controls motor units 73*e* and 73*f* to swing or move right and left side portions 73*i* and 73*j* of back rest 73. Rotation, in one direction, of motor unit 73*e* causes right side frame 73*b* to rotate and press right side portion 73*i* firmly against the right-hand side of the driver. Rotation, in the opposite direction, of motor unit 73*e* causes right side frame 73*b* to rotate and move right side portion 73*i* away from the right-hand side of the driver, thereby eliminates or at least decreases pressure applied to the right-hand side of the driver. Rotation, in one direction, of motor unit 73*f* causes left side frame 73*c* to rotate and press the left side portion 73*j* firmly against a left-hand side of the driver. Rotation, in the opposite direction, of motor unit 73*f* causes left side frame 73*c* to rotate and move left side portion 73*j* away from the left-hand side of the driver, thereby eliminates or at least decreases pressure applied to the left-hand side of the driver.

Figure 4:
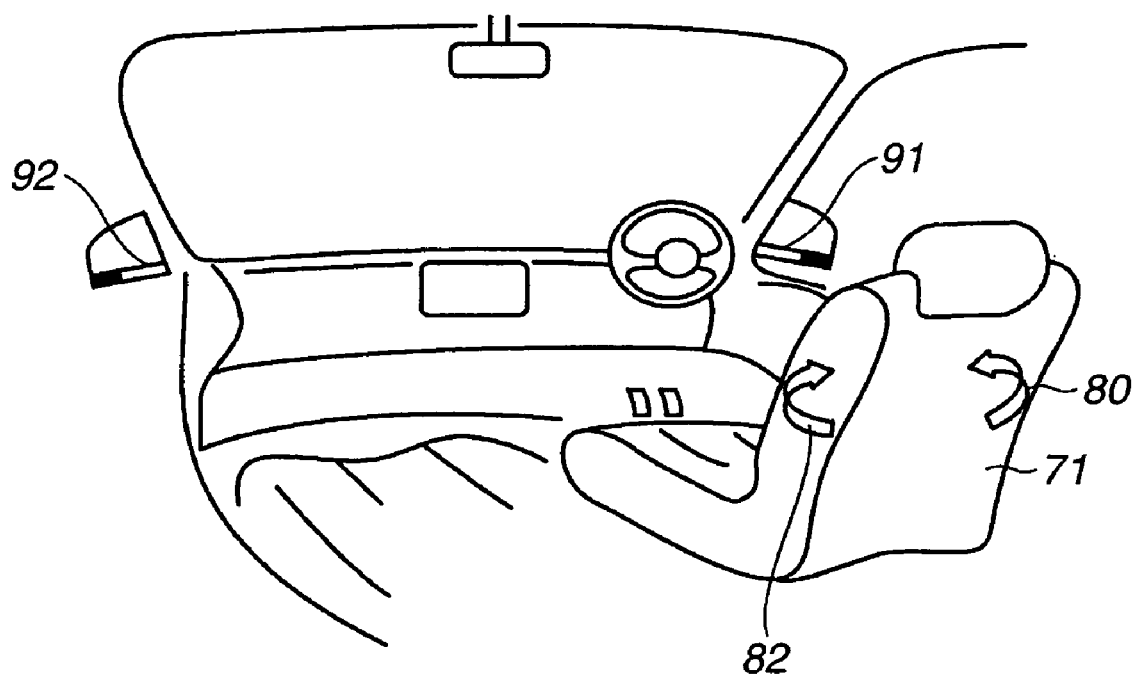
FIG. 4 is a perspective view illustrating an interior view of the automotive vehicle shown in FIG. 2.

Referring to FIG. 4, display 80 comprises a right-side display portion 91 attached to a lower portion of a right-side mirror, and a left-side display portion 92 attached to a lower portion of a left-side mirror. The right-side and left-side display portions 91 and 92 are operative to transmit or display visual information, such as the state of obstacle(s) and the risk potential calculated by controller 50 to the driver. The right-side and left-side display portions 91 and 92 are disposed not to interfere with viewing of the right-side and left-side mirrors.

Figure 5:
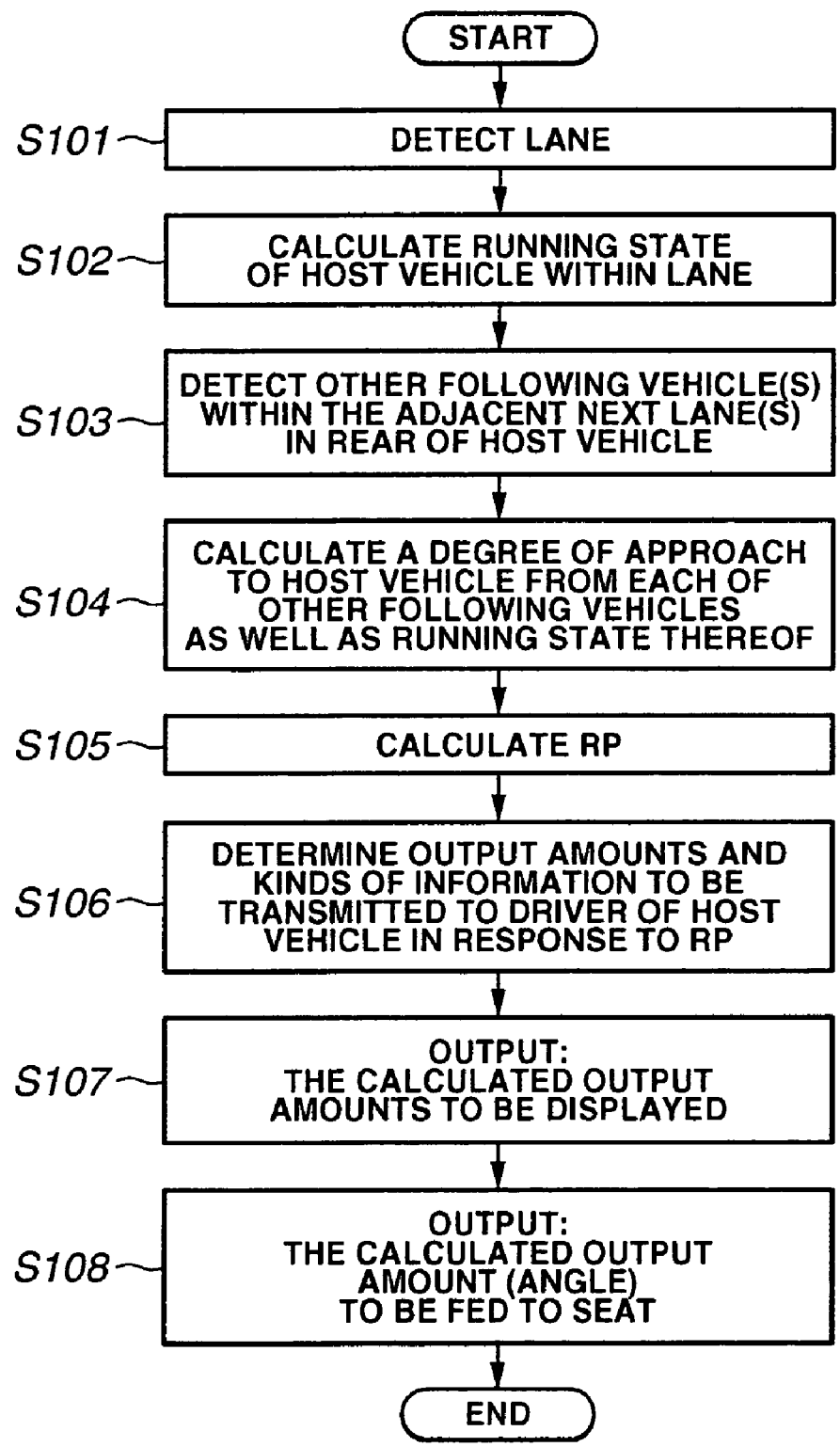
FIG. 5 is a flow chart illustrating the operation of the first exemplary embodiment.

The flow chart in FIG. 5 illustrates a processing program of the driver assisting system according to the first exemplary embodiment. Execution of this program is repeated at a regular interval of, for example, 50 milliseconds.

In FIG. 5, at step S101, controller 50 detects lane markers defining a lane in which the host vehicle is traveling. In one embodiment, controller 50 recognizes lane markers defining a lane in which the host vehicle is traveling after processing image signals that are indicative of a region in front of the host vehicle, picked up by front camera 20.

At step S102, controller 50 detects a running state of the vehicle within the lane. Specifically, controller 50 reads a vehicle speed V0 of the host vehicle detected by vehicle speed sensor 30. Further, controller 50 calculates an in-lane lateral position δ of the vehicle within the lane based on the detected lane markers at step S101 and the processed image of the region in front of the vehicle. Referring to FIG. 6(*a*), in-lane lateral position δ is defined as a distance of the center of the host vehicle from a determined centerline of the lane. The setting is such that in-lane lateral position δ is zero when the center of the host vehicle is on the lane centerline, and increases from 0 (zero) as the vehicle deviates to the right, and decreases from 0 (zero) as the vehicle deviates to the left. When the center of the host vehicle is on the lane boundary on the right, the in-lane lateral position δ is +1 (δ=+1), and when it is on the lane boundary on the left, the in-lane lateral position δ is −1 (δ=−1).

A lateral speed V_δ of the host vehicle is determined by calculating a time derivative of in-lane lateral position 67. Lateral speed V_δ is positive when the vehicle is moving to the right within the lane, while is negative when the vehicle is moving to the left within the lane.

Other definitions also can be used. For instance, an in-lane lateral position δ may be defined as a distance of a selected point O', which locates at a predetermined distance in front of the host vehicle as shown in FIG. 6(b), from the determined lane centerline.

At step S103, controller 50 detects other vehicle(s) in adjacent lane(s) that are on the right and/or left rear side of the host vehicle, and determines a running state of each of such other vehicle(s). In one embodiment, controller 50 detects such other vehicle(s) by processing image signals picked up by rear right and left side cameras 21R and 21L.

At step S104, controller 50 calculates a relative movement and/or position between the host vehicle and each of the vehicle(s) in the adjacent lane(s), as well as a running state thereof. Referring to FIG. 7, upon detecting vehicles V2 and V3 in the adjacent lanes on the right and left rear side of host vehicle V1, controller 50 detects a distance D_R from the center of host vehicle V1 to vehicle V2 and a relative speed (VR−V0) between vehicle V2 in the rear and host vehicle V1. Furthermore, controller 50 detects a distance D_L from the center of host vehicle V1 to vehicle V3 and a relative speed (VL−V0) between vehicle V3 and host vehicle V1. In the illustrated traffic scenario in FIG. 7, the reference character V1 indicates the host vehicle traveling at a speed of V0, the reference character V2 indicates the vehicle traveling at a speed of VR in the adjacent lane on the right, and the reference character V3 indicates the vehicle traveling at a speed of VL in the adjacent lane on the left. If no vehicle(s) exits in adjacent lane(s) behind host vehicle V1, controller 50 does not detect the distance and the relative speed.

Relative speed (VR−V0) represents a relative movement between host vehicle V1 and vehicle V2 traveling in the right adjacent lane behind host vehicle V1. Relative speed (VL−V0) represents a relative movement between host vehicle V1 and vehicle V3 traveling in the left adjacent lane behind host vehicle V1. The larger the relative speed (VR−V0) or (VL−V0), the faster vehicle V1 or V2 approaches host vehicle V1.

In another embodiment, a time-to-collision (TTC) between the host vehicle and the vehicle traveling in the adjacent lane behind the host vehicle may be calculated to evaluate relative movements between vehicles. The TTC between host vehicle V1 and vehicle V2 is defined by {D_R/(VR−V0)}, and the TTC between host vehicle V1 and vehicle V3 is defined by {D_L/(VL−V0)}. The TTC is a period of time for e vehicle V2 or V3 to collide with host vehicle V1 if the relative speed between the vehicles remains unchanged.

At step S105, using the running sate of the vehicle(s) in the rear calculated at step S104, controller 50 calculates a "risk potential (RP)" indicative of a collision risk between vehicle V2 or V3 traveling in adjacent lanes and host vehicle V1 upon entering the adjacent lane. In this embodiment, RP is defined as the reciprocal of an inter-vehicle distance between host vehicle V1 and vehicle V2 or V3 when host vehicle V1 enters the adjacent lane.

Inter-vehicle distance D_R', which is the distance between host vehicle V1 and vehicle V2 if host vehicle V1 enters the adjacent lane on the right. The inter-vehicle spacing D_L', which represents the distance between host vehicle V1 and vehicle V3 if host vehicle V1 enters the adjacent lane on the left. These inter-vehicle distances D_R' and D_L' may be expressed as:

$$D\_R' = \{D\_R - (VR - V0)(1-\delta)/(V\_\delta)\}$$

$$D\_L' = \{D\_L - (VL - V0)(1+\delta)/(V\_\delta)\} \quad \text{(Eq. 1)}$$

Referring to FIG. 8, when lateral speed V_δ calculated at step S102 is positive (which indicates that the host vehicle V1 is moving to the right), the inter-vehicle distance D_R' is used to calculate the RP relative to vehicle V2. When lateral speed V_δ is negative (which indicates that the host vehicle V1 is moving to the left), the inter-vehicle distance D_L' is used to calculate the RP relative to vehicle V3.

If host vehicle V1 is moving to the right, RP (RP≧0) may be expressed as:

$$RP = 1/|D\_R'| \quad \text{(Eq. 2)}$$
$$= 1/|\{D\_R - (VR - V0)(1-\delta)/(V\_\delta)\}|$$

If host vehicle V1 is moving to the left, RP (RP<0) may be expressed as:

$$RP = 1/|D\_L'| \quad \text{(Eq. 3)}$$
$$= 1/|\{D\_L - (VL - V0)(1+\delta)/(V\_\delta)\}|$$

At step S106, controller 50 determines amounts and types of information to be transmitted to the driver in response to the RP calculated at step S105. Conveyance of the state of obstacle(s) around the host vehicle V1 and the RP to the driver is now described. In this embodiment, a low RP region having a low RP limit R1 (|RP|≦R1), and a high RP region including a high limit R2 (|RP|≧R2>R1) are set. Information to be transmitted to the driver is modified based on the RP region in which the calculated RP falls.

If the calculated RP falls in the low RP region, the running state of host vehicle V1 within the lane is transmitted to the driver by activating side portions 73i and 73j, and the relative movements between host vehicle V1 and vehicle(s) V2 and/or V3 is transmitted to the driver via the right and left display portions 91 and 92. If the calculated RP falls in the high RP region, the calculated RP is transmitted to the driver by a directional indication originating from the driver toward the source causing the RP by activating the side portions 73i and 73j. The magnitude and direction of the RP are transmitted to the driver via the display portion disposed on the same side that creates the RP. An indication of the relative movements between host vehicle V1 and other vehicles in adjacent lanes behind host vehicle V1 is transmitted to the driver via the display portion disposed on the opposite side.

The following descriptions describe how the outputs of information to be transmitted to the driver are calculated when the calculated RP falls in the low RP region.

A rotation angle θ1 through which side portion 73i or 73j swings or moves is calculated based on in-lane lateral position 67. Rotation angle θ1 is expressed as:

$$\theta 1 = k1 \cdot \delta \quad \text{(Eq. 4)}$$

In the Eq. 4, k1 is a predetermined coefficient converting in-lane lateral position δ to rotation angle θ1 through which the side portion 73i or 73j swings or moves. If rotation angle θ1 is positive or zero (θ1≧0) and vehicle V1 is traveling in the right half side of the lane, right side portion 73*i* swings toward the driver to apply a pressure input to the driver from the right. If the rotation angle θ1 is negative (θ1<0) and vehicle V1 is traveling in the left half side of the lane on the left, left side portion 73*j* swings toward the driver to apply a pressure input to the driver from the left.

Using Eq. 5 (explained below), an output L1_R of right display portion 91 is calculated based on a relative movement between host vehicle V1 and vehicle V2. Using the following Eq. 6, an output L1_L of the left display portion 92 is calculated based on a relative movement between host vehicle V1 and vehicle V3. This embodiment uses the relative speed between the host and the vehicle in the rear to indicate the relative movements between the vehicles:

$$L1\_R = k2 \cdot (VR - V0) \qquad \text{(Eq. 5)}$$

$$L1\_L = k2 \cdot (VL - V0) \qquad \text{(Eq. 6)}$$

In Eq. 5 and Eq. 6, k2 is a predetermined coefficient converting the relative speeds (VR−V0) and (VL−V0) to the outputs L1_R and L1_L, respectively.

Referring to FIGS. 10(*a*) and 10(*b*), the right display portion 91 is shown. FIG. 10(*a*) shows an exemplary display of right display portion 91 when the calculated RP falls in the low RP region. Right display portion 91 is equipped with an indicator bar displaying section 91*a* and a mark displaying section 91*b*. Indicator bar displaying section 91*a* presents a varying number of indicator bars 91*c* by lighting an appropriate number of bars corresponding to output L1_R indicative of the relative speed between host vehicle V1 and vehicle V2. Mark displaying section 91*b* displays, in number, the relative speed. Left display portion 92 is substantially the same as right display portion 91 and equipped with an indicator bar displaying section 92*a* and a mark displaying section 92*b*, which will be described later.

The following sections provide description on the manner by which outputs of information to be transmitted to the driver are calculated when the calculated RP falls in the high RP region.

When the calculated RP that falls in the high RP region is derived from the right, a rotation angle θ2 through which right side portion 73*i* swings is calculated based on the calculated RP. Rotation angle θ2 is expressed as:

$$\theta2 = k3 \cdot RP + \theta0 \qquad \text{(Eq. 7)}$$

In Eq. 7, k3 is a predetermined coefficient converting the RP into the rotation angle θ2.

When the calculated RP that falls in the high RP region is derived from the right (RP≧0), an output L2_R of right display portion 91 is calculated, using Eq. 8 (shown below), based on the calculated RP derived from vehicle V2. Using the following Eq. 9, an output L2_L of left display portion 92 is calculated based on a relative speed between host vehicle V0 and vehicle V3 in the rear left side of host vehicle.

$$L2\_R = k4 \cdot RP + L0 \qquad \text{(Eq. 8)}$$

$$L2\_L = k2 \cdot (VL - V0) \qquad \text{(Eq. 9)}$$

In Eq. 8, k4 is a predetermined coefficient converting the RP into the output L2_R.

FIG. 10(*b*) is an exemplary display of right display portion 91 when the calculated RP that falls in the high RP region is derived from the right. Indicator bar displaying section 91*a* displays an appropriate number of indicator bars 91*c* corresponding to output L2_R indicative of the calculated RP derived from vehicle V2 in the right rear side of host vehicle. Mark displaying section 91*b* displays a mark, for example, an exclamation mark or a warning symbol, to inform the driver that the calculated RP falls in the high RP region.

When the calculated RP that falls in the high RP region is derived from the left (RP<0), a rotation angle θ2 through which left side portion 73*j* swings is calculated based on the calculated RP. The rotation angle θ2 is expressed as:

$$\theta2 = k3 \cdot RP - \theta0 \qquad \text{(Eq. 10)}$$

When the calculated RP that falls in the high RP region is derived from the left (RP<0), an output L2_R of the right display portion 91 is calculated, using the following Eq. 11, based on a relative speed between host vehicle V0 and vehicle V2 in the right rear vicinity of host vehicle. Using the following Eq. 12, an output L2_L of the left display portion 92 is calculated based on the RP derived from vehicle V3 in the left rear vicinity of host vehicle V1, such as in the left adjacent lane.

$$L2\_R = k2 \cdot (VR - V0) \qquad \text{(Eq. 11)}$$

$$L2\_L = -(k4 \cdot RP - L0) \qquad \text{(Eq. 12)}$$

When the calculated RP falls in a transient region between the low and high RP regions (R1<|RP|<R2), the pressure input from seat 71 and the displayed information change gradually between the low and high RP regions by calculating a rotation angle θ through which side portion 73*i* or 73*j* using Eq. 13 (shown below), and by calculating an output L_R of the display portion on the right 91 using Eq. 14 and/or an output L_L of the displaying section on the left 92 using Eq. 15.

$$\theta = \{\theta1 \cdot (R2 - |RP|) + \theta2 \cdot (|RP| + R1)\}/(R2 - R1) \qquad \text{(Eq. 13)}$$

$$L\_R = \{L1\_R \cdot (R2 - |RP|) + L2\_R \cdot (|RP| - R1)\}/(R2 - R1) \qquad \text{(Eq. 14)}$$

$$L\_L = \{L1\_L \cdot (R2 - |RP|) + L2\_L \cdot (|RP| - R1)\}/(R2 - R1) \qquad \text{(Eq. 15)}$$

When rotation angle θ calculated using Eq. 13 is positive, right side portion 73*i* swings, and when rotation angle θ is negative, left side portion 73*j* swings. After calculating rotation angles of the left and right side portions 73*i* and 73*j* and the outputs of the left and right display portions 91 and 92, the program proceeds to step S107.

At step S107, output L_R or L1_R or L2_R is fed to right display portion 91 of the display 90, and the output L_L or L1_L or L2_R is fed to left display portion 92 of the display 90. Left and right display portions 91 and 92 provide displays in response to commands from the controller 50. Left and right display portions 91 and 92 provide a series of indicator bars 91*c* and another series of indicator bars 92*c* by lighting an appropriate numbers of bars corresponding to the fed outputs.

At step S108, rotation angle θ or θ1 or θ2 calculated at step S106 is fed to seat side driver mechanism 70. Seat side driver mechanism 70 can rotate left and right side portions 73*i* and 73*j*. The seat side driver mechanism 70 activates right side portion 73*i* when the rotation angle θ or θ1 or θ2 is positive, and it activates left side portion 73*j* when the rotation angle θ or θ1 or θ2 is negative.

Referring to FIGS. 11(*a*) to 13(*b*), the operation of the first exemplary embodiment of driver assisting system 1 is further described.

FIG. 11(*a*) is a traffic scene in which a host vehicle V1 is driving in the middle lane, a vehicle V2 is driving in the right adjacent lane on the rear vicinity of host vehicle V1, and a vehicle V3 driving in the left adjacent lane in the rear vicinity of host vehicle V1. A RP to host vehicle V1 falls in the low RP region. In this scenario, information is transmitted to the driver of host vehicle V1 via a plurality of interfaces, such as, driver's seat 71 and display 90, in the manner described below in connection with FIG. 11(b).

Referring to FIGS. 11(a) and 11(b), as host vehicle V1 is traveling within the left half side of the lane ($\delta<0$), left side portion 73j swings toward the driver by a rotation angle $\theta 1$ corresponding to in-lane lateral position $\delta$. Indicator bar displaying section 91a of right display portion 91 activates an appropriate number of indicator bars 91c corresponding to a speed vehicle V2 approaching host vehicle V1. Mark displaying section 91b displays the speed of vehicle V2 approaching host vehicle V1. Indicator bar displaying section 92a of left display portion 92 activates an appropriate number of indicator bars 92c corresponding to a speed of vehicle V3 approaching host vehicle V1. Mark displaying section 92b displays the speed vehicle V3 approaching the host vehicle V1.

Figure 12A:
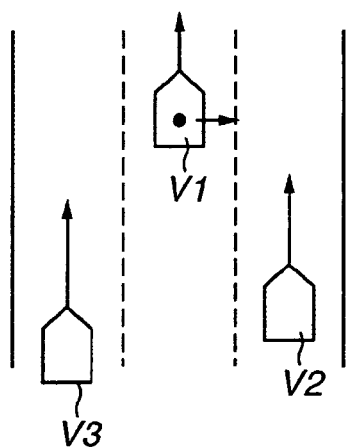
FIG. 12(a) is a traffic scene when the RP falls in the high RP region.

FIG. 12(a) is another traffic scene in which host vehicle V1 is traveling in the middle lane, a vehicle V2 is traveling in the right adjacent lane in the rear vicinity of host vehicle V1, and a vehicle V3 traveling in the left adjacent lane in the rear vicinity of host vehicle V1. A RP associated with host vehicle V1 falls in the high RP region. In this scenario, information is transmitted to the driver of host vehicle V1 via a plurality of interfaces, such as the driver's seat 71 and the display 90, in the manner described below in connection with FIG. 12(b).

Figure 12B:
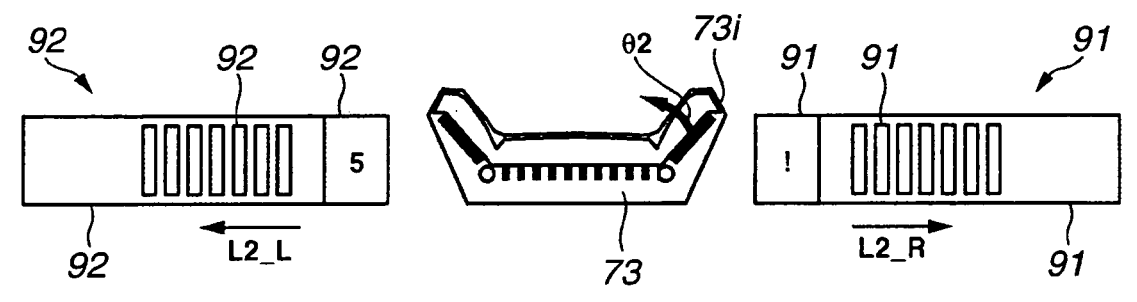
FIG. 12(b) shows the transmission of different pieces of information to the driver when the RP falls in the high RP region.

Referring to FIGS. 12(a) and 12(b), as the host vehicle V1 is traveling in the right half side of the lane ($\delta>0$), the RP indicative of the collision risk with vehicle V2 in the rear increases, so that right side portion 73i swings toward the driver by a rotation angle $\theta 2$ corresponding to the RP. Indicator bar displaying section 91a of right display portion 91 activates an appropriate number of indicator bars 91c corresponding to the RP, and mark displaying section 91b displays an exclamation mark or a warning signal. Indicator bar displaying section 92a of left display portion on 92 activates an appropriate number of indicator bars 92c corresponding to the speed of vehicle V3 approaching host vehicle V1, and mark displaying section 92b displays the speed of vehicle V3 approaching host vehicle V1.

Figure 13A:
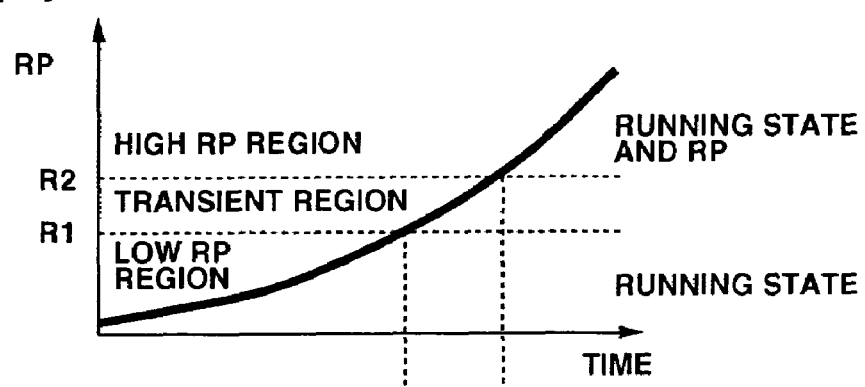
FIG. 13(a) graphically represents varying of the risk potential RP derived from a vehicle in the rear and traveling along the adjacent lane on the right with time in an increasing direction from the low risk (RP) region to the high risk (RP) region past the transient region.
Figure 13B:
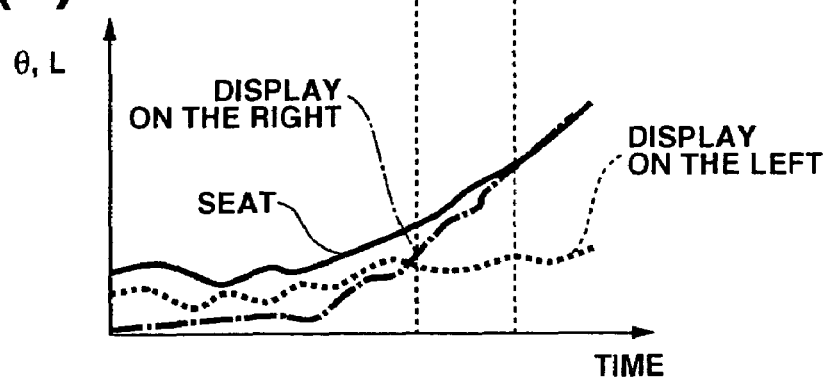
FIG. 13(b) graphically represents varying of different pieces of information transmitted to the driver with time along with the varying of the RP as shown in FIG. 13(a).

FIG. 13(a) represents varying of a RP associated with vehicle V2 increasing from the low RP region to the high RP region passing the transient region. The change of RP as shown in FIG. 13(a) causes information transmitted to the driver to change, in amount, with time as shown in FIG. 13(b). In the low RP region ($RP \leq R1$), different types of information are transmitted to the driver via seat 71, right display portion 91 and left display portion 92. Specifically, information related to the state of running of host vehicle V1 within the lane is transmitted to the driver via seat 71, information related to the relative movement between host vehicle V1 and vehicle V2 is transmitted to the driver via right display portion 91, and information related to the relative movement between host vehicle V1 and vehicle V3 is transmitted to the driver via left display portion 92.

Responsive to the RP exceeding a predetermined value R1 to enter the transient region, the rotation angle $\theta$ through which right side portion 73i rotates or moves is calculated based on rotation angle $\theta 1$ calculated for the low RP region and the rotation angle $\theta 2$ calculated for the high RP region for a smooth change of pressure input to the driver from seat 71 during a transient period from the low RP region to the high RP region. The indicator bar displaying section 91a of right display portion 91 activates an appropriate number of indicator bars 91c corresponding to the output L_R that is calculated based on the output L1_R calculated for the low RP region and the output L2_R calculated for the high RP region. The indicator bar displaying section 92a of left display portion 92 activates an appropriate number of indicator bars 92c corresponding to the output L_L which is calculated based on the output L1_L calculated for the low RP region and the output L2_L calculated for the high RP region.

After the RP exceeds the predetermined value R2 to enter the high RP region, the magnitude of the RP and the direction in which the RP comes to the host vehicle V1 are transmitted to the driver via seat 71 and right display portion 91. Information related to the relative movement between host vehicle V1 and vehicle V3 is transmitted to the driver via left display portion 92.

The first exemplary embodiment provides the following effects and benefits:

(1) Driving assisting system 1 assists a driver of a host vehicle V1 traveling on a road along a lane. System 1 calculates an in-lane running state of host vehicle V1; a running state of each of vehicles V2 and V3, wherein V2 travels in the right rear vicinity of host vehicle V1, and vehicle V3 travels in the left rear vicinity of host vehicle V1; and a risk potential RP of host vehicle V1 to collide with a selected one of vehicles V2 and V3. Controller 50 generates information to be presented to the driver via an interface 70 and 90 after evaluating the calculated risk potential RP whether the calculated risk potential falls in a high risk (RP) region or in a low risk (RP) region. System 1 selectively provides the driver with information related to an in-lane running state of the host vehicle V1, the running state of the vehicle V2 or V3 and the risk potential RP associated thereto, and whether the risk potential RP is high (falls in the high risk (RP) region) or low (falls in the low risk (RP) region).

(2) System 1 transmits an amount and a direction of the source of a risk potential RP to the driver when the risk potential RP falls in the high risk (RP) region ($RP \geq R2$). This makes it possible to transmit information related to the risk to the driver quickly as soon as the risk increases, thereby prompts the driver to operate host vehicle V1 in an appropriate manner in view of the increased risk.

(3) System 1 transmits an in-lane running state of host vehicle V1 when the calculated risk potential RP falls in the low risk (RP) region ($|RP| \leq R1$). This makes it possible for the driver to acquire the in-lane running state of host vehicle V1, allowing the driver to conduct an appropriate operation of host vehicle V1.

(4) System 1 transmits, in addition to the in-lane running state of host vehicle V1, running states of vehicles V2, V3 when the calculated risk potential RP falls in the low risk (RP) region ($|RP| \leq R1$). This makes it possible for the driver to acquire the running states of vehicles V2, V3 in the rear, allowing the driver to conduct an appropriate operation of host vehicle V1.

(5) The system 1 transmits the amount and direction of the calculated risk potential RP to the driver by pressure input via driver's seat 71 when the calculated risk potential RP falls in the high risk (RP) region. The pressure input is regulated by activating right side portion 73i and left side portion 73j of driver's seat 71 via seat side driver mechanism 70 to swing toward, or away from, the driver. The driver can recognize the amount and direction of the calculated risk potential RP via the magnitude of pressure input and portion of seat 71 from which the pressure input applies.

(6) System 1 transmits the amount and direction of the calculated risk potential RP to the driver via right display portion 91 and left display portion 92 when the calculated risk potential RP falls in the high risk (RP) region. A selected one of display portions 91 and 92 that is located near the source of the risk potential activates an appropriate number of indicator bars corresponding to the amount of the calculated risk potential RP. This makes it possible for the driver to easily perceive the amount and the direction of the calculated risk potential RP. Because display portions 91 and 92 are located near lower ends of the door or side mirrors, the driver may confirm the source of the calculated risk potential RP by viewing the side mirrors of the vehicle.

(7) System 1 transmits the in-lane running state of host vehicle V1 to the driver by pressure input via driver's seat 71 when the calculated risk potential RP falls in the low risk (RP) region. The driver can recognize the lane boundary that host vehicle V1 is approaching, and how close host vehicle V1 has approached the lane boundary via the magnitude of pressure input and the portion of seat 71 from which the pressure input applies.

(8) System 1 transmits the detected running states of vehicles V2 and V3 in the rear vicinity of host vehicle V1 to the driver by visual display via right display portion 91 and left display portion 92 when the calculated risk potential RP falls in the low risk (RP) region. Right display portion 91 presents the running state of vehicle V2 in the right rear vicinity of host vehicle V1, and left display portion 92 visually displays the running state of vehicle V3 in the right rear vicinity of host vehicle V1. This makes it possible for the driver to distinctly acquire the running states of vehicles V2 and V3 relative to host vehicle V1.

(9) System 1 transmits the in-lane running state of host vehicle V1 by an in-lane lateral position δ of host vehicle V1. This makes it possible for the driver to acquire the in-lane lateral position δ to conduct operation of host vehicle V1 in an appropriate manner.

(10) System 1 transmits the running state of vehicles V2 and V3 in the rear vicinity of host vehicle V1 by providing information of relative movements between host vehicle V1 and vehicles V2 and V3. This makes it possible for the driver to perceive relative movements of other vehicles and to operate host vehicle V1 in an appropriate manner.

Second Exemplary Embodiment

The second exemplary embodiment is substantially the same as the first exemplary embodiment illustrated in FIGS. 1 to 13. However, the second exemplary embodiment is different from the first exemplary embodiment in that a display 90 (see FIG. 1) presents information in a different manner when the risk potential RP falls in the high RP region.

Referring to FIG. 14, the second exemplary embodiment is the same as the first exemplary embodiment in the manner of presenting information when the risk potential RP falls in the low RP region. In the low RP region, the in-lane running state of a host vehicle is transmitted to the driver via a seat 71, and display portions of the display 90 on the right and on the left display a degree of a vehicle in the rear approaching the host vehicle from the left and/or right, respectively.

When the risk potential RP falls in the high RP region, the amount of the risk potential RP and the direction associated with the risk potential RP are transmitted to a driver via a driver seat 71. Besides, one of the display portions of the display 90 that corresponding to the cause of the risk potential presents the amount and direction of the risk potential RP, and the other display portion presents a degree of approach to the host vehicle by the vehicle. In the second exemplary embodiment, indicator bars of the display portions present the risk potential RP and the degree of approach to the host vehicle by the vehicle in the rear in different color. The indicator bars is reduced in size to present the degree of approach.

FIG. 15(*a*) shows a display portion 91\* on the right using a first display state to present a degree of approach to the host vehicle by the vehicle in the rear from the right when the risk potential RP caused by a vehicle in the rear from the left falls in the high RP region. FIG. 15(*b*) shows the display portion 91\* on the right using a second display state to present the risk potential RP derived by the vehicle in the rear from the right when this risk potential RP falls in the high RP region. In the second exemplary embodiment, a display portion on the right 91\* is provided with a bar displaying section 91\**a* only, and a display portion on the left 92\* is provided with a bar displaying section 92\**a* only.

If a risk potential RP, which falls in the high RP region, is caused by the vehicle in the rear from the left, the display portion on the right 91\* displays, as shown in FIG. 15(*a*), a series of indicator bars 91\**c* with variable length according different values of the output L2_R indicating a degree of approach to the host vehicle by the vehicle in the rear from the right. In this case, the series of indicator bars 91\**c* is reduced in size as the risk potential RP increases.

If a risk potential RP, which falls in the high RP region, is caused by the vehicle in the rear from the right, the display portion on the right 91\* displays, a shown in FIG. 15(*b*), the series of indicator bars 91\**c* variable in length with different values of the risk potential RP. In this case, the series of indicator bars 91\**c* changes to a different display color. For example, the different display color has a brightness higher than or a cue darker than a display color of the train of indicator bars 91\**c* indicating the degree of approach to the host vehicle by the vehicle in the rear, thereby to make the train of indicator bars 91\**c* in this state prominent.

The way that the size W of each indicator bar is set is described below.

If the risk potential RP falls in the low RP region ($|RP| \leq R1$), the size WR of each the indicator bars 91\**c* of the display portion on the right 91\*, and the size WL of each of the indicator bars 92\**c* of the display portion on the left 92\* are set equal to a standard value W0(WR=WL=W0).

If the risk potential RP from the right exceeds the predetermined value R1, the size WR of each of the indicator bars 91\**c* of the display portion on the right 91\*, and the size WL of each of the indicator bars 92\**c* of the display portion on the left 92\* are expressed as:

$$WR = W0$$

$$WL = W0 - (RP - R2)/R3 \quad \text{(Eq. 16)}$$

If the risk potential $|RP|$ from the left exceeds the predetermined value R1, the size WR of each of the indicator bars 91\**c* of the display portion on the right 91\* and the size WL of each of the indicator bars 92\**c* of the display portion on the left 92\* are expressed as:

$$WR = W0 - (|RP| - R2)/R3$$

$$WL = W0 \quad \text{(Eq. 17)}$$

In Eq. 16 and Eq. 17, R3 is a predetermined constant.

Figure 16A:
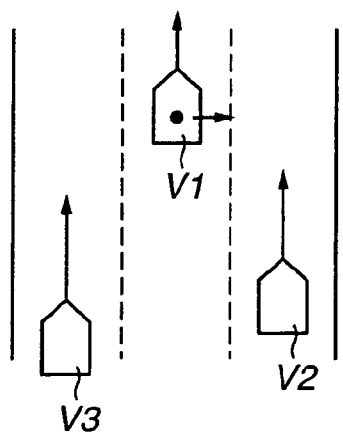
FIG. 16(a) is a traffic scene when the RP falls in the high RP region.

FIGS. 16(*a*) and 16(*b*) describe the operation of the second exemplary embodiment.

If the risk potential RP falls in the high RP region according to a traffic scene as shown in FIG. 16(*a*), in which vehicles V2 and V3 are in the rear or a host vehicle on the right and the left, a plurality types of information are transmitted to the driver of the host vehicle V1 via a plurality of interfaces, such as the driver seat 71 and display 90.

Figure 16B:
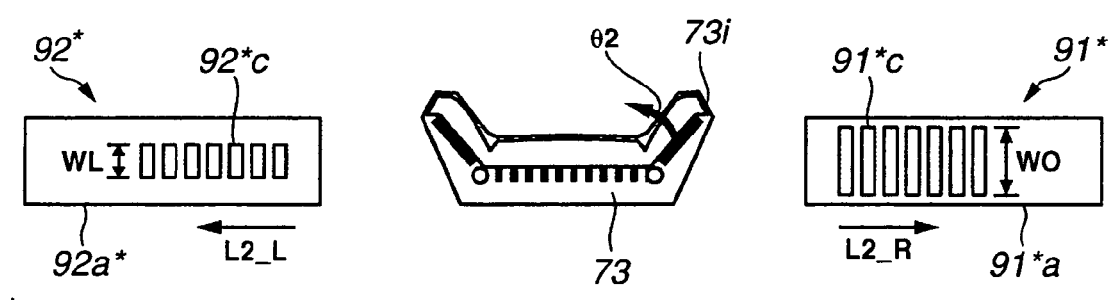
FIG. 16(b) shows the transmission of different pieces of information to the driver when the RP falls in the high RP region.

As the host vehicle V1 moves to the right within its lane, the risk potential RP that the host vehicle V1 might collide with vehicle V2 on the right becomes high. Referring to FIG. 16(b), a side portion 73i of a back rest 73 swings toward the driver by a rotation angle θ2 according to the risk potential RP. The indicator bar displaying section 91*a of the display portion on the right 91* turns on a number of indicator bars 91*c according to the risk potential RP, each of which has a high brightness or a dark clue. The indicator bar displaying section 92*a of the display portion on the left 92* turns on a number of indicator bars 92*c according to the degree of approach to the host vehicle V1 by the vehicle V3 from the left, each of which has a reduced size WL.

The second exemplary embodiment provides an effect as follows:

Upon displaying the calculated risk potential RP when it falls in the high risk (RP) region, a train of indicator bars is displayed in a different color on the display portion on the side corresponding to the increased risk, which is different from a color of a train of indicator bars on the display portion on the opposite side. The different colors make it easy for the driver to recognize that the indicator bars begins to indicate the calculated risk potential RP. At the same time, the size W of the indicator bars of the display portion on the opposite side is adjusted to a reduced size in accordance with the amount of the calculated risk potential RP. Reducing the size W of the indicators of the display portion on the opposite side as the calculated risk potential RP grows allows the indicator bars corresponding to the side of higher risk to be easy to notice.

Third Exemplary Embodiment

The third exemplary embodiment of a driver assisting system is substantially the same as the first exemplary embodiment illustrated in FIGS. 1 to 13. However, the third exemplary embodiment is different from the first exemplary embodiment in the contents transmitted to a driver via a driver seat 71.

FIG. 17 illustrates conveyance of risk information around a host vehicle according to the third embodiment. In the low RP region, the manner of transmitting information to the driver is the same as the first exemplary embodiment. In the high RP region, the manner of presenting information via display portions and the contents of the information are the same as the first exemplary embodiment. However, different from the first exemplary embodiment, according to the third exemplary embodiment, the driver seat 71 transmits to the driver a running state of the host vehicle within the lane as well as a risk potential RP, both in amount and in direction, when the risk potential RP falls in the high RP region.

A rotation angle θR through which a side portion 73i of a back rest 73 of the driver seat 71 swings, and a rotation angle θL through which a side portion 73j of the back rest 73 swings are calculated in a manner described below. For simplicity of illustration, a positive sign is assigned to the rotation angle θL through which the side portion 73j swings.

A rotation angle θ_δ according to an in-lane lateral position δ is calculated using the equation below:

$$\theta\_\delta = k1 \cdot \delta \quad \text{(Eq. 18)}$$

Next, a rotation angle θ_r based on the risk potential RP is calculated using the equation below:

$$\theta\_r = k3 \cdot RP \quad \text{(Eq. 19)}$$

If the risk potential RP falls in the low RP region (|RP|≦R1), the rotation angle θR for the side portion on the right 73i and the rotation angle θL for the side portion on the left 73j are calculated using equations as follows:

$$\theta R = \max(\theta\_\delta, 0)$$

$$\theta L = \max(-\theta\_\delta, 0) \quad \text{(Eq. 20)}$$

If the risk potential RP falls in the high RP region (|RP|>R1), the rotation angle θR for the side portion on the right 73i and the rotation angle θL for the side portion on the left 73j are calculated using equations as follows:

$$\theta R = \max(\theta\_\delta, 0) + \max(\theta\_r, 0)$$

$$\theta L = \max(-\theta\_\delta, 0) + \max(-\theta\_r, 0) \quad \text{(Eq. 21)}$$

In the low RP region, either the side portion on the right 73i or side portion on the left 73j swings through the rotation angle θ_δ according to the in-lane lateral position δ of the host vehicle. For example, if the host vehicle is traveling within the right half of the lane, the side portion on the right 73i swings toward the driver side.

In the high RP region, at least one of the side portion 73i and side portion 73j swings through a rotation angle based on θ_δ, which corresponds to the in-lane lateral position δ, and the rotation angle θ_r, which corresponds to the risk potential RP.

For example, if the risk potential RP comes from the right when the host vehicle is traveling in the right half of the lane, the side portion on the right 73i swings toward the driver through the rotation angle θR that is given by adding the rotation angle θ_r depending on the risk potential RP to the rotation angle θ_δ depending on the in-lane lateral position δ. In this case, the side portion on the left 73j does not swing.

If the host vehicle is traveling within the left half of the lane when the risk potential RP falling in the high RP region is from the right, the side portion on the right 73i swings toward the driver through the rotation angle θR that is given by the rotation angle θ_r depending on the risk potential RP, and the side portion on the left 73j swings toward the driver through the rotation angle θL that is given by the rotation angle θ_δ depending on the in-lane lateral position δ.

In addition to the effects provided by the first exemplary embodiment, the third exemplary embodiment provides an effect as follows:

When the calculated risk potential RP falls in the high risk (RP) region, the system 1 transmits the in-lane running state of the host vehicle V1 in addition to the amount of and direction of the calculated risk potential RP to the driver by pressure input(s) via the driver's seat 71. In other words, if the in-lane lateral position δ of the host vehicle V1 and the direction of the calculated risk potential RP are the same, the side portion in the direction of the calculated risk potential swings through a rotation angle that combines the in-lane lateral position δ and the calculated risk potential RP. On the other hand, if the directions are opposite to each other, the in-lane lateral position δ and the calculated risk potential RP are transmitted to the driver from the side portions 73i and 73j, separately. This makes it possible to clearly transmit to the driver different pieces of information in accordance with different running states of the host vehicle V1.

Fourth Exemplary Embodiment

The fourth exemplary embodiment of a driver assisting system is substantially the same as the first exemplary embodiment illustrated in FIGS. 1 to 13. However, the fourth exemplary embodiment is different from the first exemplary embodiment in the following respects.

According to the fourth exemplary embodiment, a vehicle speed V0 of a host vehicle is used to correct a risk potential RP caused by a vehicle in the rear. The fully drawn line in FIG. 18 illustrates the relationship between a correction coefficient C_v and the vehicle speed V0. As shown in FIG. 18, if the vehicle speed V0 is less than or equal to a first predetermined vehicle speed value V01, the correction coefficient C_v is fixed at a first predetermined value C1 (for example, C1=1). If the vehicle speed V0 exceeds the first predetermined vehicle speed value V01, the correction coefficient C_v gradually increases as the vehicle speed V0 increases, and the correction coefficient C_v is fixed at a predetermined value C2 (C2>C1) upon the vehicle speed V0 exceeding a second predetermined vehicle speed value V02 (V02>V01).

If the host vehicle is moving to the right within the lane, the risk potential RP caused by the vehicle in the rear on the right (RP≧0) is calculated using the correction coefficient from an equation as follows:

$$RP = \{1/|D\_R'|\} \cdot C\_v \quad \text{(Eq. 22)}$$
$$= [1/|\{D\_R - (VR - V0) \cdot (1 - \delta)/(V\_\delta)\}|] \cdot C\_v$$

If the host vehicle is moving to the left within the lane, the risk potential RP caused by the vehicle in the rear on the left (RP<0) is calculated using the correction coefficient from an equation as follows:

$$RP = -\{1/|D\_L'|\} \cdot C\_v \quad \text{(Eq. 23)}$$
$$= -[1/|\{D\_L - (VL - V0) \cdot (1 + \delta)/(V\_\delta)\}|] \cdot C\_v$$

In the high RP region, the risk potential RP given by the equations Eq. 22 or 23 is used to calculate a rotation angle θR for a side portion on the right 73$i$ or a rotation angle θL for a side portion on the left 73$j$, and to calculate an output L_R to be presented by a display portion on the right 91 and an output L_L to be presented by a display portion on the left 92.

Figure 19A:
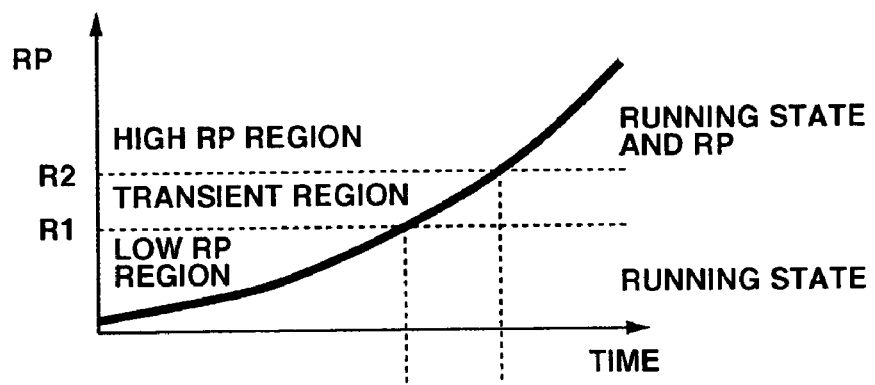
FIG. 19(a) illustrates varying of a risk potential RP derived by the vehicle in the rear with time at low vehicle speed V0.
Figure 19B:
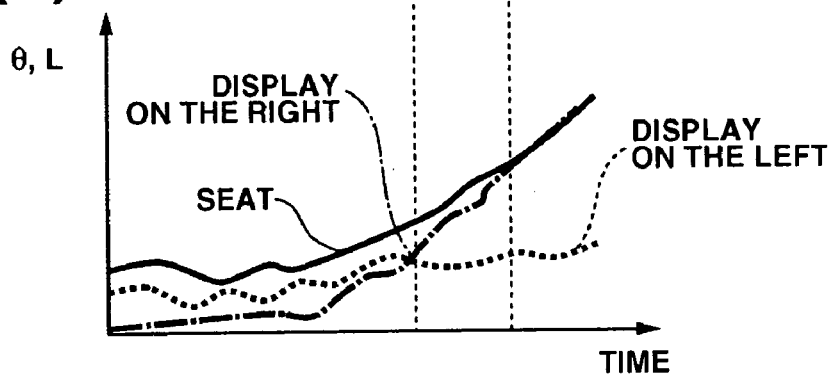
FIG. 19(b) illustrates varying of pieces of information transmitted to the driver with time along with the varying of the risk potential RP as shown in FIG. 19(a).
Figure 20A:
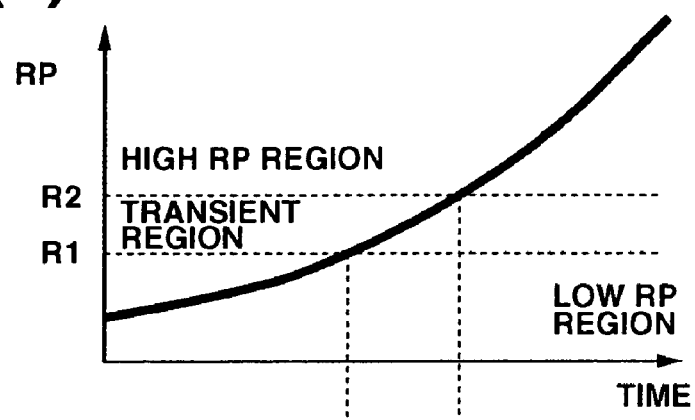
FIG. 20(a) illustrates varying of a risk potential RP derived by the vehicle in the rear with time at high vehicle speed V0.
Figure 20B:
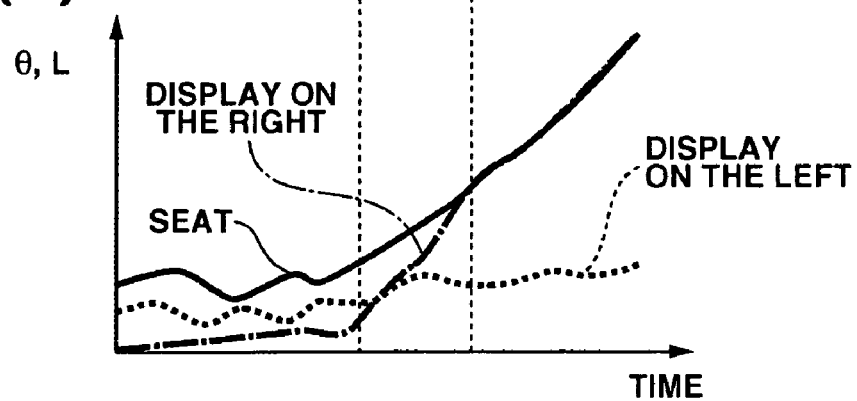
FIG. 20(b) illustrates varying of pieces of information transmitted to the driver with time along with the varying of the risk potential RP as shown in FIG. 20(a).

FIG. 19($a$) illustrates values of risk potential RP caused by the vehicle in the rear on the right with time when the speed V0 of the host vehicle is low (for example, V0<V01). FIG. 19($b$) illustrates values of different types of information transmitted to the driver along with the risk potential RP as shown in FIG. 19($a$). FIG. 20($a$) illustrates the risk potential RP caused by the vehicle in the rear on the right when the speed V0 of the host vehicle is high (for example, V0>V02). FIG. 20($b$) illustrates values of information transmitted to the driver relative to time, along with the risk potential RP as shown in FIG. 20($a$). A comparison between FIG. 19($a$) to FIG. 20($a$) clearly reveals that the risk potential RP increases quickly.

According to the fourth exemplary embodiment, with the same inter-vehicle distance D_R' established when the host vehicle enters the adjacent next lane on the right, the risk potential calculated at high vehicle speed V0 (V0>V01) is greater than the risk potential calculated at low vehicle speed V0 (V0≦V01). This means that the driver seat 71 is activated and pieces of information are displayed earlier at high vehicle speed V0 than they are at low vehicle speed V0.

Even if the vehicle speed V0 is high, the in-lane lateral position of the host vehicle is transmitted to the driver via the driver seat 71 and degrees of approach by the vehicles in the rear are presented to the driver via the display portion on the right 91 and the display portion on the left 92 when the risk potential RP falls in the low RP region.

Fifth Exemplary Embodiment

The fifth exemplary embodiment of a driver assisting system is substantially the same as the first exemplary embodiment illustrated in FIGS. 1 to 13. However, the fifth exemplary embodiment is different from the first exemplary embodiment in the following respects.

The fifth exemplary embodiment considers a curvature ρ of a road, which a host vehicle is traveling on, when calculating a risk potential RP. The road curvature ρ is calculated based on a running state of the host vehicle and information obtained from a navigation system. If the host vehicle is headed in a direction toward the right, the risk potential RP is calculated using the road curvature ρ (RP≧0) from an equation as follows: The sign of road curvature ρ is positive for a curve to the right.

$$RP = 1/|D\_R'| + \max(-k5 \cdot \rho, 0) \quad \text{(Eq. 24)}$$
$$= 1/|\{D\_R - (VR - V0) \cdot (1 - \delta)/(V\_\delta)\}| + \max(-k5 \cdot \rho, 0)$$

If the host vehicle is headed in a direction toward the left, the risk potential RP is calculated using the road curvature ρ (RP<0) from an equation as follows:

$$RP = -1/|D\_L'| + \min(-k5 \cdot \rho, 0) \quad \text{(Eq. 25)}$$
$$= -1/|\{D\_L - (VL - V0) \cdot (1 + \delta)/(V\_\delta)\}| + \min(-k5 \cdot \rho, 0)$$

In the high RP region, the risk potential RP given by the equations Eq. 24 or 25 is used to calculate a rotation angle θR for a side portion on the right 73$i$ or a rotation angle θL for a side portion on the left 73$j$, and to calculate an output L_R to be presented by a display portion on the right 91 and an output L_L to be presented by a display portion on the left 92.

As the fifth exemplary embodiment considers the road curvature ρ when calculating the risk potential RP, the risk potential RP calculated based on a movement of the host vehicle toward a curved outer lane boundary is larger than that of the host vehicle moving toward a curved inner lane boundary. The risk potential RP is transmitted to the driver upon movement of the host vehicle toward the curved outer lane boundary earlier than it is upon movement of the host vehicle toward the curved inner lane boundary.

Sixth Exemplary Embodiment

The sixth exemplary embodiment of a driver assisting system is substantially the same as the first exemplary embodiment illustrated in FIGS. 1 to 13. However, the sixth exemplary embodiment is different from the first exemplary embodiment in the following respects.

As shown in FIG. 21, the sixth exemplary embodiment uses an indicator lamp 93 disposed at a portion below a front pillar on the right, and an indicator lamp 94 disposed at a portion below a front pillar on the left, instead of the display portions 91 and 92 provided at side mirrors on the right and on the left (see FIG. 4).

Referring to FIG. 22, in the low RP region, an in-lane running state of a host vehicle is transmitted to a driver via a driver seat 71, and a degree of approach to the host vehicle by the vehicles in the rear is presented via the indicators 93 and 94 by adjusting the brightness of the indicator 93 in accordance with an output L1_R calculated based on the degree of approach by the vehicle in the rear on the right and by adjusting the brightness of the indicator 94 in accordance with an output L1_L calculated based on the degree of approach by the vehicle in the rear on the left. The greater the outputs L1_R and L1_L, the brighter are the indicator lamps 93 and 94. The brightness of the indicator lamp 93 located below the front pillar on the right indicates a degree of approach by the vehicle in the rear within the adjacent next lane on the right. The brightness of the indicator lamp 94 located below the front pillar on the left indicates a degree of approach by the vehicle in the rear within the adjacent next lane on the left.

In the high RP region, the driver seat 71 transmits to the driver of the host vehicle both quantity and direction of the risk potential R_P. Besides, the indicator lamps on the same side of the risk potential RP flashes and operates in the maximum brightness. The other indicator lamp operates in a degree of brightness in accordance with an output calculated based on a degree of approach to the host vehicle by the vehicle in the rear on the opposite side. According to another embodiment, instead of adjusting the brightness of each of the indicator lamps 83 and 84, the clue of each of them may be adjusted.

In the above-mentioned manner, the indicator lamps 93 and 94 are arranged on the right and left, and pieces of information are clearly and distinctly transmitted to the driver by adjusting the brightness or clue of each of the indicator lamps 93 and 94 in accordance with the degree of approach by the vehicles in the rear and/or the risk potential RP.

Seventh Exemplary Embodiment

The seventh exemplary embodiment of a driver assisting system is substantially the same as the first exemplary embodiment illustrated in FIGS. 1 to 13. However, the seventh exemplary embodiment is different from the first exemplary embodiment in the following respects.

According to the seventh exemplary embodiment, a display 90A is provided in a meter cluster. This embodiment is not provided with the display portion on the right 91 and the display portion on the left 92.

FIG. 23 shows the display 90A provided with the meter cluster in an exemplified state. At an upper section of a middle portion, the display 90A displays a host vehicle V1. At a lower section on the right, the display 90A displays the vehicle V2 in the rear on the right. At a lower section on the left of the displayed host vehicle V1, the display 90A displays the vehicle V3 in the rear on the left. The display 90A controls a train of indicator bars 97 extending from the displayed vehicle V2 and a train of indicator bars 98 extending from the displayed vehicle V3. In addition, a relative speed or an exclamation mark associated with V2 and/or V3 is displayed.

Referring to FIG. 24, in the low RP region, an in-lane running state of a host vehicle V1 is transmitted to a driver via a driver seat 71, and degrees of approach to the host vehicle by the vehicles V2 and V3 are presented via the indicator bars 97 and 98 by turning on a number of indicator bars 97 in accordance with an output L1_R calculated based on the degree of approach by the vehicle V2, and turning on a number of indicator bars 98 in accordance with an output L1_L calculated based on the degree of approach by the vehicle V3.

In the high RP region, the driver seat 71 transmits to the driver of the host vehicle V1 both amount and in direction of the risk potential RP. In addition, the display 90A selectively turns on the trains of indicator bars 97 and 98 according to the side near corresponding to the risk potential RP, and displays an exclamation mark with the displayed vehicle V2 or V3. The display 90A turns on a number of indicator bars 98 or 97 of the other side, according to an output calculated based on a degree of approach to the host vehicle by the vehicle in the rear from the opposite side.

FIG. 23 illustrates the state in which the risk potential RP caused by the vehicle V2 falls in the high RP region. Thus, the display 90A turns on a number of indicator bars 97 above the vehicle V2 according to the risk potential RP, and displays an exclamation mark within the vehicle V2. The display 90A turns on a number of indicator bars 98 above the vehicle V3 according to the degree of approach by the vehicle V2 in the rear, and displays the relative speed to the vehicle V3.

In the above-mentioned manner, with the display 90A disposed in the meter cluster, necessary information is clearly and distinctly transmitted to the driver by displaying the degree of approach by the vehicles and/or the risk potential RP.

Eighth Exemplary Embodiment

The eighth exemplary embodiment of a driver assisting system is substantially the same as the first exemplary embodiment illustrated in FIGS. 1 to 13. However, the eighth exemplary embodiment is different from the first exemplary embodiment in the following respects.

In the high RP region, the eighth exemplary embodiment vibrates a side portion on the right 73$i$ of a back rest 73 of a driver seat 71 or a side portion on the left 73$j$ of the back rest 73 of the driver seat 71 to transmit a risk potential RP, in both amount and direction, to a driver of a host vehicle. The vibrations of side portions 73$i$ and 73$j$ may be achieved by controlling motor units 73$e$ and 73$f$ via a seat side driver mechanism 70 to move the side portions 73$i$ and 73$j$. Embedded oscillators may be use to vibrate the side portions 73$i$ and 73$j$.

A rotation angle θR through which the side portion on the right 73$i$ swings, and a rotation angle θL through which the side portion on the left 73$j$ swings are calculated in a manner described below. These rotation angles θR and θL may vary depending on the risk potential RP. For ease of description, the rotation angle θL through which the side portion on the left 73$j$ swings is assigned with a positive sign.

In the low RP region, the rotation angle θR for the side portion on the right 73$i$ and the rotation angle θL for the side portion on the left 73$j$ are calculated using equations below. A rotation angle θ_δ depending on an in-lane lateral position δ is calculated using equation Eq. 18.

$$\theta R = \max(\theta\_\delta, 0)$$

$$\theta L = \max(-\theta\_67, 0) \quad \text{(Eq. 26)}$$

In the high RP region, if the risk potential RP is derived from the right, the rotation angle θR for the side portion on the right 73$i$ and the rotation angle θL for the side portion on the left 73$j$ are expressed as:

θR: Vibration with amplitude of k6

θL=0

In the high RP region, if the risk potential RP is derived from the left, the rotation angle θR for the side portion on the right 73*i* and the rotation angle θL for the side portion on the left 73*j* are expressed as:

θR=0

θL=Vibration with amplitude of k6

In the transient RP region (R1<RP<R2), if the risk potential RP is derived from the right, the rotation angle θR for the side portion on the right 73*i* and the rotation angle θL for the side portion on the left 73*j* are calculated using the following equations:

θR: Vibration with amplitude that is expressed as {k6·(RP−R1)/(R2−R1)}

$$θL=θ\_δ·\{1-(RP-R1)/(R2-R1)\} \quad (Eq. 27)$$

In the transient RP region (R1<RP<R2), if the risk potential RP is derived from the left, the rotation angle θR for the side portion on the right 73*i* and the rotation angle θL for the side portion on the left 73*j* are calculated using the following equations:

$$θR=θ\_δ·\{1-(|RP|-R1)/(R2-R1)\}$$

θL: Vibration with amplitude that is expressed as {k6·(|RP|−R1)/(R2−R1)} (Eq. 28)

In the high RP region, the side portion near the adjacent next lane where the risk potential RP is derived from vibrates to clearly transmit where the risk potential RP is derived from. The driver may easily recognize whether the risk potential falls in the high RP region or the low RP region because haptic input via the driver seat 71 in the high RP region is quite different, in form, from haptic input via the driver seat 71 in the low RP region.

In the high RP region, the amplitude with which the side portion 73*i* or 73*j* vibrates may increase as the risk potential RP increases.

Ninth Exemplary Embodiment

Figure 25:
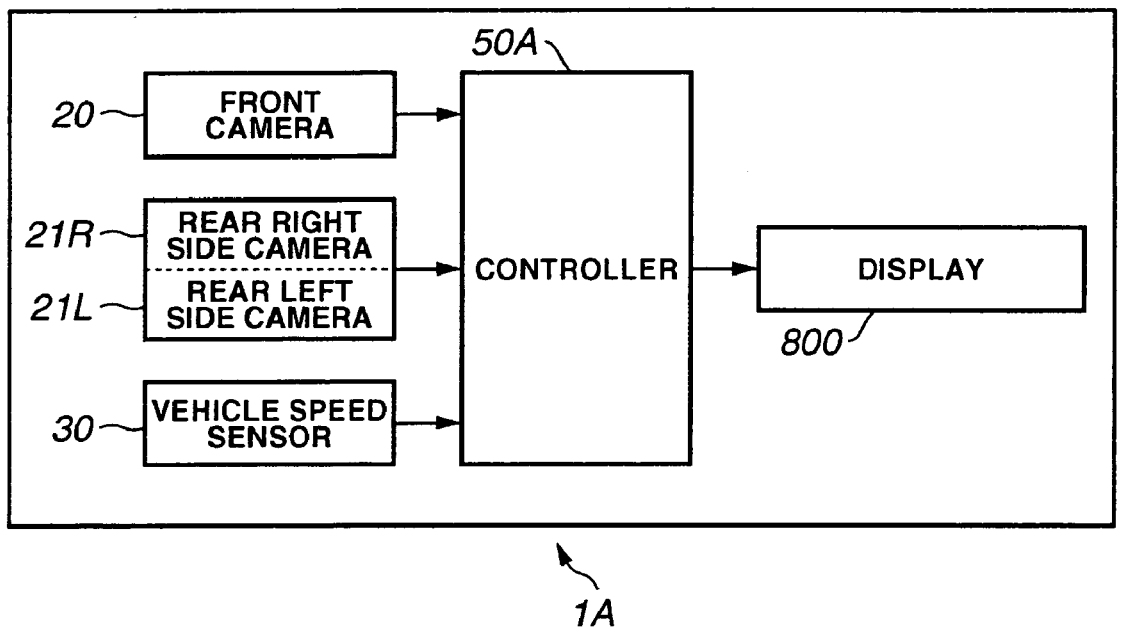
FIG. 25, is a block diagram illustrating a ninth exemplary embodiment of a driver assisting system according to the present disclosure.

The ninth exemplary embodiment of a driver assisting system 1A is described below. FIG. 25 is a block diagram of the driver assisting system 1A. The driver assisting system 1A shown in FIG. 25 is substantially the same as the driver assisting system 1 shown in FIG. 1. Like reference numerals are used to designate like parts or portions throughout FIGS. 1 and 25. However, the ninth exemplary embodiment is different from the first exemplary embodiment in the following respects.

Figure 26:
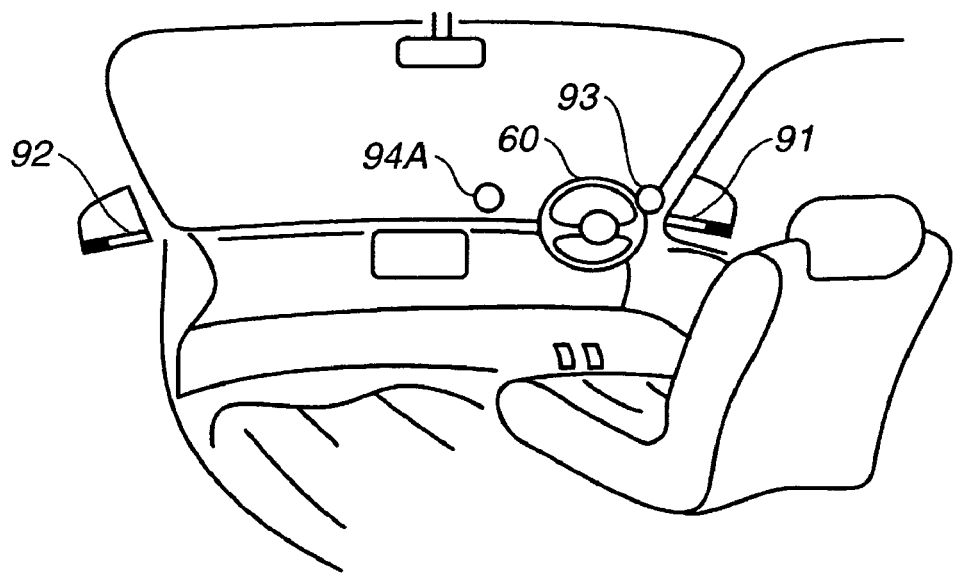
FIG. 26 is a similar view to FIG. 21 illustrating a display composed of indicator lamps employed by the ninth exemplary embodiment.

In the driver assisting system 2, the seat side driver mechanism 70 is not provided, and a display 800 is used to transmit the obstacle state around a host vehicle and a risk potential RP caused by the vehicle in the rear. Referring to FIG. 26, the display 800 is provided with a display portion on the right 91 and a display portion on the left 92, which are provided at lower portions of side mirrors on the right and left. Further, the display 800 is provided with an indicator lamp on the right 93 and an indicator lamp on the left 94A, which are arranged on an instrument panel. The indicator lamp 93 on the right 93 is disposed on right side of a steering wheel 60, and the indicator lamp 94A is disposed on left side of the steering wheel 60.

Referring to FIG. 27, in the low RP region, the indicator lamps 93 and 94A transmit an in-lane state of the host vehicle to the driver. Specifically, the in-lane state of the host vehicle is transmitted to the driver by turning on a light to and/or setting the brightness of the indicator lamp on the right 93 or the indicator lamp on the left 94A in response to an in-lane lateral position δ of the host vehicle. For example, if the host vehicle is traveling in the right half of the lane, the indicator lamp on the right 93 is turned ON, while the indicator lamp on the left 94A is turned OFF. In this case, the brightness of the indicator lamp on the right 93 increases as the host vehicle approaches the lane boundary. The display portion on the right 91 and the display portion on the left 92 display degrees of approach to the host vehicle by vehicles in the rear.

In the high RP region, the indicator lamps 93 and 94A transmit where the risk potential RP is derived from to the driver. Specifically, the indicator lamp 93 or 94A corresponding to the direction from which the risk potential RP is derived operates at its maximum brightness and is repeatedly turned ON/OFF to operate as a flasher. The other indicator lamp on the opposite side is turned OFF. The display portion 91 or 92 near the side where the risk potential RP is derived from displays the risk potential RP, in both amount and direction, and the display portion on the opposite side displays a degree of approach to the host vehicle by the vehicle in the rear on the opposite side.

The ninth exemplary embodiment has an effect as follows:

The driver assisting system 1A transmits the in-lane running state, the risk potential RP with respect to the vehicle V2 or V3 in the rear, and running states of the vehicles V2 and V3 in the rear to the driver via the display portion on the right 91, the display portion on the left 92, and indicator lamps 93 and 94A. The system modifies information to be transmitted to the driver in response to the risk potential RP. In this manner, information selected from the in-lane running state of the host vehicle V1, running states of the vehicles V2 and V3, and risk potential RP, in low risk (RP) region or high risk (RP) region, is transmitted to the driver.

Tenth Exemplary Embodiment

The tenth exemplary embodiment of a driver assisting system is substantially the same as the first exemplary embodiment illustrated in FIGS. 1 to 13. However, the tenth exemplary embodiment is different from the first exemplary embodiment in the following respects.

According to the tenth exemplary embodiment, a seat side driver mechanism 70 activates a cushion portion 72 in addition to a back rest portion 73. FIG. 26 shows one form of a seat 710 activated by the seat side mechanism 70 according to the tenth exemplary embodiment. A side portion on the right 73*i* and a side portion on the left 73*j* of the back rest 73 are activated to swing by motor units 73*e* and 73*f* in the same manner as they are in the first exemplary embodiment.

The cushion portion 72 is provided with a cushion frame 72*a*, a sub-frame on the right 72*b* and a sub-frame on the left 72*c*. These frames 72*a*, 72*b* and 72*c* are covered by a urethane pad. The cushion frame 72*a* has attached springs 72*d* to support the urethane pad. The sub-frame on the right 72*b* and sub-frame on the left 72*c* are activated to swing by motor units 72*e* and 72*f*, respectively, through respective torque cables 72*g* and 72*h*. The movements of the sub-frame on the right 72*b* and sub-frame on the left 72*c* cause a side portion on the right 72*i* and a side portion on the left 72*j* of the cushion portion 72 to swing.

According to the tenth exemplary embodiment, in the high RP region, if the risk potential RP is small, the side portion 73*i* or 73*j* of the back rest 73 on the side corresponding to the risk potential RP is activated to swing toward the driver. If the risk potential RP increases and becomes large, the side portion 72*i* or 72*j* of the cushion portion 72 on the side where the risk potential RP is derived from is additionally activated to swing toward the driver in order to clearly transmit to the driver the amount of risk potential RP and the direction or side from which the risk potential RP is derived. Transmission of an increase in the risk potential RP is further clarified as the pressure input applies to the driver increases.

In the high RP region, if the risk potential RP is small, the side portion 72*i* or 72*j* of the cushion portion 72 may be activated to swing toward the driver. If the risk potential RP increases or becomes large, the side portion 73*i* or 73*j* of the back rest 73 may be additionally activated to swing toward the driver, thereby to further clarify transmission of an increase in risk potential RP to the driver.

In the first to eighth, and tenth exemplary embodiments, the side portion(s) on the right and the side portion(s) on the left of the driver's seat 71, 710 are moved by the motor units 73*e*, 73*f*, 72*e*, and 72*f* to apply pressure to the driver. The present disclosure is not limited to this mechanism. Other types of pressure regulation approaches can be utilized to implement the concepts of this disclosure. For instance, it is possible to apply pressure input to the driver by regulating pressure within an air bag(s) embedded into the driver's seat 71, 710.

In the first to tenth exemplary embodiments, the calculated risk potential RP that the host vehicle may collide with is transmitted to the driver by pressure input via the driver's seat using the seat side driver mechanism 70 and by presentation via the display 80 or 800. The present disclosure is not limited to this mechanism or control arrangement. For example, it is possible to transmit the calculated risk potential RP to the driver by pressure input via a steering wheel by regulating a reaction force associated with the steering wheel. In other words, when the risk potential falls in the high risk (RP) region, the calculated risk RP is transmitted to the driver by a regulated reaction force associated with the steering wheel to prompt the driver to steering the host vehicle in a direction to avoid the vehicle in the rear originating the calculated risk potential RP. It is also possible to transmit the calculated risk potential to the driver by a combination of pressure input via the driver's seat 71, 710, presentation by the display and the reaction force associated with the steering wheel. It is also possible to transmit the calculated risk potential RP to the driver via the display and the reaction force associated with the steering wheel.

In the sixth and ninth exemplary embodiments, the indicator lamps 93 and 94A are provided. The arrangement is not limited to this example. For example, in the sixth exemplary embodiment, they may be arranged on the left and right of the steering wheel. In the ninth exemplary embodiment, the indicator lamps 93 and 94A may be arranged under the right front pillar and the left front pillar.

In the first to tenth exemplary embodiments, the front camera 20*a* serves as a first detector detecting an in-lane running state of the host vehicle within the lane, and rear cameras 21R and 21L serve as a second detector. The second detector detects a running state of each of vehicles in the rear of the host vehicle, one traveling on first side of the host vehicle, another traveling on second side of the host vehicle. The controller 50 or 50A serves as a risk potential calculator. The risk potential calculator calculates a risk potential that a selected vehicle in the rear of the host vehicle may come into contact with the host vehicle based on the detected in-lane running state and the detected running state of the selected vehicle in the rear. The seat side driver mechanism 70 and display 90 or 800 serves as an interface with the driver. The controller 50 or 50A serves as an information regulator. The information regulator modifies information to be presented to the driver via the interface after evaluating the calculated risk potential whether the calculated risk potential falls in the high risk RP region or in the low risk RP region, Although the disclosure has been shown and described with respect to the exemplary embodiments, it is obvious that equivalent alterations and modifications will occur to those skilled in the art upon reading and understanding of the specification. The present disclosure includes all such equivalent alterations and modifications, and is limited only by the scope of the claims.

What is claimed is:

1. A driving assisting system for use in a vehicle comprising:
    a detector configured to acquire data related to a driving condition of the vehicle and an object in the vicinity of the vehicle;
    a data processor configured to perform the steps of:
        calculating a collision risk potential of the vehicle to collide with the object based on the data related to the driving condition of the vehicle and the object; and
        providing information related to the collision risk potential to the driver of the vehicle via a visual signal and a haptic signal;
    wherein:
    reponsive to the collision risk potential being a low risk, the data processor is configured to provide information related to a position of the vehicle within the lane in which the vehicle is driving via a haptic signal from the driver's seat; and
    responsive to the collision risk potential qualifying as a high risk, the data processor is configured to provide at least one of an indication of a position of the object relative to the vehicle, a relative speed between the object and the vehicle, a distance between the vehicle and the object, and a magnitude of the risk potential via at least one of a haptic signal and a visual display.

2. A driving assisting system for use in a vehicle comprising:
    a detector configured to acquire data related to a driving condition of the vehicle and an object in the vicinity of the vehicle;
    a data processor configured to perform the steps of:
        calculating a collision risk potential of the vehicle to collide with the object based on the data related to the driving condition of the vehicle and the object; and
        providing information related to the collision risk potential to the driver of the vehicle via a visual signal and a haptic signal, wherein the provided information is selected from multiple types of information including at least two of a position of the vehicle within the lane in which the vehicle is driving, a relative position between the vehicle and the object, a relative movement between the vehicle and the object, a direction from which the object is approaching the vehicle, and the calculated collision risk potential.

3. The system of claim 1, wherein the provided information relates to at least one of an indication of a position of the object relative to the vehicle, a relative speed between the object and the vehicle, a distance between the vehicle and the object, and a magnitude of the risk potential.

4. The system of claim 1, wherein the haptic signal is conveyed via the driver's seat of the vehicle.

5. The system of claim 3, wherein:
    the visual signal is displayed via a first display device corresponding to the left side of the vehicle, and a second display device corresponding to the right side of the vehicle; and
    the visual signal is conveyed via one of the first display device and the second display device that corresponds to the position of the object relative to the vehicle.

6. The system of claim 5, wherein the first display device is disposed on or near the left side mirror of the vehicle, and the second display device is disposed on or near the right side mirror of the vehicle.

7. A driving assisting system for use in a vehicle comprising:
- a detector configured to acquire data related to a driving condition of the vehicle and an object in the vicinity of the vehicle;
- a data processor configured to perform the steps of:
  - calculating a collision risk potential of the vehicle to collide with the object based on the data related to the driving condition of the vehicle and the object; and
  - providing information related to the collision risk potential to the driver of the vehicle via a visual signal and a haptic signal,
- wherein the haptic signal is conveyed via the driver's seat of the vehicle; and
- wherein:
  - the haptic signal includes at least one of a first haptic input provided from a first portion of the driver's seat corresponding to the left side of the vehicle, and a second haptic input provided from a second portion of the driver's seat corresponding to the right side of the vehicle; and
  - the haptic signal is conveyed via one of the first portion of the driver's seat and the second portion of the driver's seat that corresponds to the position of the object relative to the vehicle.

8. The system of claim 4, wherein the haptic signal is regulated to reflect the magnitude of the risk potential.

9. The system of claim 1, wherein the object is a vehicle.

10. A driving assisting method for use in a vehicle comprising:
- acquiring data related to a driving condition of the vehicle and an object in the vicinity of the vehicle;
- calculating a collision risk potential of the vehicle to collide with the object based on the data related to the driving condition of the vehicle and the object; and
- providing information related to the collision risk potential to the driver of the vehicle via a haptic signal and a visual signal;
- responsive to the collision risk potential being a low risk, providing information related to a position of the vehicle within the lane in which the vehicle is driving via a haptic signal from the driver's seat; and
- reponsive to the collision risk potential quality as a high risk, providing at least one of an indication of a position of the object relative to the vehicle, a relative speed between the object and the vehicle, a distance between the vehicle and the object, and a magnitude of the risk potential via at least one of a haptic signal and a visual display.

11. A driving assisting method for use in a vehicle comprising:
- acquiring data related to a driving condition of the vehicle and an object in the vicinity of the vehicle;
- calculating a collision risk potential of the vehicle to collide with the object based on the data related to the driving condition of the vehicle and the object;
- determining a spatial relationship of the object relative to the vehicle; and
- providing information related to the collision risk potential and the spatial relationship of the object relative to the vehicle, via a visual display and a haptic signal.

12. A vehicle comprising:
- a detector configured to acquire data related to a driving condition of the vehicle and an object in the vicinity of the vehicle;
- a data processor configured to perform the steps of:
  - calculating a collision risk potential of the vehicle to collide with the object based on the data related to the driving condition of the vehicle and the object; and
  - providing information related to the collision risk potential to the driver of the vehicle via a haptic signal and a visual signal;
- wherein:
- responsive to the collision risk potential being a low risk, the data processor is configured to provide information related to a position of the vehicle within the lane in which the vehicle is driving via a haptic signal from the driver's seat; and
- responsive to the collision risk potential qualifying as a high risk, the data processor is configured to provide at least one of an indication of a position of the object relative to the vehicle, a relative speech between the object and the vehicle, a distance between the vehicle and the object and a magnitude at the risk potential via at least one of a haptic signal and a visual display.

13. A driving assisting system for use in a vehicle comprising:
- means for acquiring data related to a driving condition of the vehicle and an object in the vicinity of the vehicle;
- data processing means configured to perform the steps of:
  - calculating a collision risk potential of the vehicle to collide with the object based on the data related to the driving condition of the vehicle and the object; and
  - providing information related to the collision risk potential to the driver of the vehicle via a haptic signal and a visual signal;
- wherein:
- responsive to the collision risk potential being a low risk, the data processing means is configured to provide information related to a position of the vehicle within the lane in which the vehicle is driving via a haptic signal from the driver's seat; and
- responsive to the collision risk potential qualifying as a high risk, the data processing means is configured provide at least one of an indication of a position of the object relative to the vehicle, a relative speed between the object and the vehicle, a distance between the vehicle and the object, and a magnitude of the risk potential via at least one of a haptic signal and a visual display.

14. The system of claim 13, wherein:
- the provided information relates to at least one of an indication of a position of the object relative to the vehicle, a relative speed between the object and the vehicle, a distance between the vehicle and the object, and a magnitude of the risk potential; and
- the visual signal is provided via display means.

15. A driving assisting system for use in a vehicle comprising:
- a detector configured to acquire data related to a driving condition of the vehicle and an object in the vicinity of the vehicle; and
- a data processor configured to perform the steps of:
  - calculating a collision risk potential of the vehicle to collide with the object based on the data related to the driving condition of the vehicle and the object;
  - determining a spatial relationship of the object relative to the vehicle; and providing information related to the collision risk potential and the spatial relationship of the object relative to the vehicle, via a visual display and a haptic signal.

16. A driving assisting system for use in a vehicle comprising:
- a detector configured to detect a running state of the vehicle within a lane;
- a detector configured to detect a running state of another vehicle that runs rear of the vehicle;
- a risk potential calculation section configured to calculate a contact risk potential of the vehicle to contact with the another vehicle based on the detected running state of the vehicle and the detected running state of the another vehicle;
- an information transmission device configured to transmit information to a driver of the vehicle;
- an information modification section configured to modify information to be transmitted by the device in response to whether the calculated risk potential is in a low risk area that is less than a predetermined value or the calculated risk potential is in a high risk area that is greater than or equal to the predetermined value.

17. The driving assisting system as claimed in claim 16, wherein, when the calculated risk potential is in the high risk area, the information modification section allows the information transmission device to transmit to the driver of the vehicle the magnitude and direction of the calculated risk potential.

18. The driving assisting system as claimed in claim 16, wherein, when the calculated risk potential is in the low risk area, the information modification section allows the information transmission device to transmit to the driver of the vehicle the detected running stare of the vehicle within the lane.

19. The driving assisting system as claimed in claim 18, wherein, when the calculated risk potential is in the low risk area, the information modification section allows the information transmission device to transmit to the driver of the vehicle the detected running state of the another vehicle in addition to the detected running state of the vehicle within the lane.

20. The system of claim 17, wherein:
- the information transmission device includes a seat pressure control device configured to apply pressure to the driver of the vehicle from a driver's seat; and
- when the calculated risk is in the high risk area, the sear pressure control device applies pressure to the driver via the driver's seat according to the magnitude and direction of the calculated risk potential.

21. The driving misting system as claimed in claim 17, wherein the information transmission device is disposed on each of the left hand and right hand sides of the driver of the vehicle and includes a display that is configured to display the magnitude and direction of the calculated risk potential when the calculated risk potential is in the high risk area.

22. The driving misting system as claimed in claim 18, wherein the information transmission device includes a sear pressure control device that is configured to apply pressure to the driver of the vehicle from a driver's seat in response to the running state of the vehicle within the lane when the calculated risk potential is in the low risk are.

23. The driving misting system as claimed in claim 19, wherein the information transmission device is disposed on each of the left hand and right hand sides of the driver of the vehicle and includes a display that is configured to display the detected running state of the another vehicle when the calculated risk potential is in the low risk area.

24. The driving assisting system as claimed in claim 19, wherein the information transmission device is disposed on each of the left hand and right hand sides of the driver of the vehicle and includes an indicator lamp that changes its color and brightness in response to the detected running state of the another vehicle when the calculated potential risk is in the low risk area.

25. The driving misting system as claimed in claim 17, wherein the information transmission device includes a vibration generation device that is configured to vibrate that portion of a drivers seat which corresponds to the direction of the calculated risk potential when the calculated risk potential is in the high risk area.

26. The driving assisting system as claimed in claim 17, wherein the information transmission device includes indicator lamps on the left hand and right hand of the driver of the vehicle and causes that one of the indicator lamps which corresponds to the direction of the calculated risk potential to turn on/off when the calculated risk potential is in the high risk area.

27. The driving assisting system as claimed in claim 18, wherein the information transmission device transmits to the driver of the vehicle a literal position of the vehicle within the lane, as the detected running state of the vehicle within the lane.

28. The driving misting system as claimed in claim 19, wherein the information transmission device transmits to the driver of the vehicle a degree to which the another vehicle approaches the vehicle, as the detected running state of the another vehicle.

29. A vehicle incorporating the driving assisting system as claimed in claim 16.

* * * * *

UNITED STATES PATENT AND TRADEMARK OFFICE
CERTIFICATE OF CORRECTION

PATENT NO. : 7,558,672 B2  
APPLICATION NO. : 11/140943  
DATED : July 7, 2009  
INVENTOR(S) : Masahiro Egami et al.

Page 1 of 1

It is certified that error appears in the above-identified patent and that said Letters Patent is hereby corrected as shown below:

IN THE CLAIMS:

In Column 26, line 21: Change "speech" to --speed--.

In Column 27, line 50: Change "misting" to --assisting--.

In Column 28, line 5: Change "misting" to --assisting--.

In Column 28, line 6: Change "sear" to --seat--.

In Column 28, line 10: Change "are" to --area--.

In Column 28, line 11: Change "misting" to --assisting--.

In Column 28, line 24: Change "misting" to --assisting--.

In Column 28, line 39: Change "literal" to --lateral--.

In Column 28, line 42: Change "misting" to --assisting--.

Signed and Sealed this

Eleventh Day of May, 2010

David J. Kappos  
*Director of the United States Patent and Trademark Office*